United States Patent [19]

Washio et al.

[11] 4,033,689

[45] July 5, 1977

[54] COMPACT OPTICAL SYSTEM FOR AN ELECTROSTATIC PHOTOGRAPHIC COPYING APPARATUS

[75] Inventors: Takaji Washio, Toyonaka; Koichi Sasaki; Tatsuo Aizawa, both of Osaka, all of Japan

[73] Assignee: Mita Industrial Company, Ltd., Osaka, Japan

[22] Filed: Apr. 22, 1975

[21] Appl. No.: 570,426

Related U.S. Application Data

[62] Division of Ser. No. 399,516, Sept. 21, 1973, Pat. No. 3,923,391.

[30] Foreign Application Priority Data

Sept. 24, 1972 Japan .............................. 47-95460

[52] U.S. Cl. ..................................... 355/8; 355/11; 355/51; 355/66

[51] Int. Cl.[2] .................. G03G 15/28; G03B 27/70

[58] Field of Search .................. 355/11, 43, 51, 60, 355/65, 66, 3 R, 3 DD, 8

[56] References Cited

UNITED STATES PATENTS

| | | | |
|---|---|---|---|
| 3,508,825 | 4/1970 | Hyosaka | 355/11 |
| 3,841,753 | 10/1974 | Ogawa | 355/66 |
| 3,850,520 | 11/1974 | Washio et al. | 355/66 |
| 3,883,240 | 5/1975 | Ito et al. | 355/3 DD |

FOREIGN PATENTS OR APPLICATIONS

| | | | |
|---|---|---|---|
| 450,919 | 5/1968 | Switzerland | 355/25 |

*Primary Examiner*—L. T. Mix
*Assistant Examiner*—J. A. LaBarre
*Attorney, Agent, or Firm*—Sherman & Shalloway

[57] ABSTRACT

An electrostatic photographic copying apparatus includes an optical system for projecting an image of an original onto the surface of a photosensitive drum. System consists of openings for exposure of the original and the photosensitive drum, first and second reflex mirrors, and a mirror lens. The mirror lens is disposed so that light from the original is relected by the first reflex mirror into said mirror lens and from the mirror lens back to the first reflex mirror. The light from the original is then reflected by the first reflex mirror to the second reflex mirror and from the second reflex mirror onto the photosensitive drum to thereby form a four-fold reverse image of the original being copied.

6 Claims, 16 Drawing Figures

Fig. 8-A
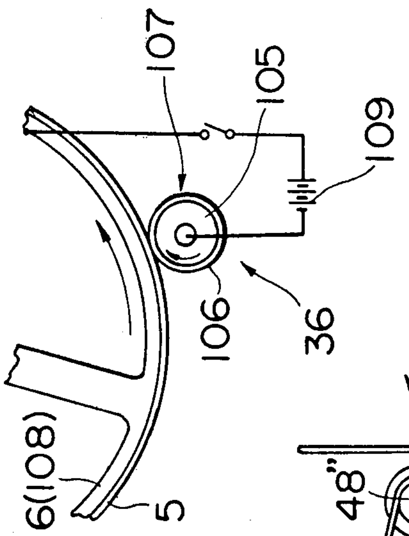
Fig. 8-B
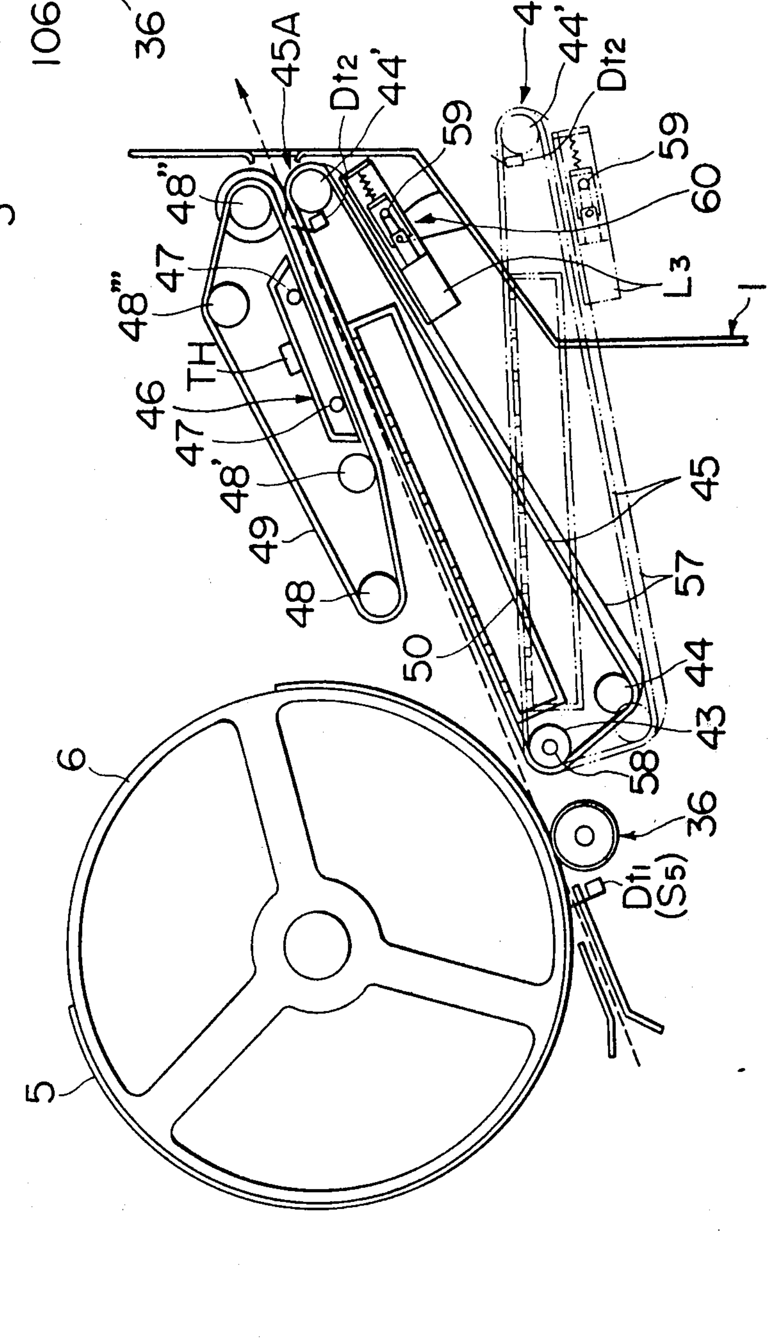

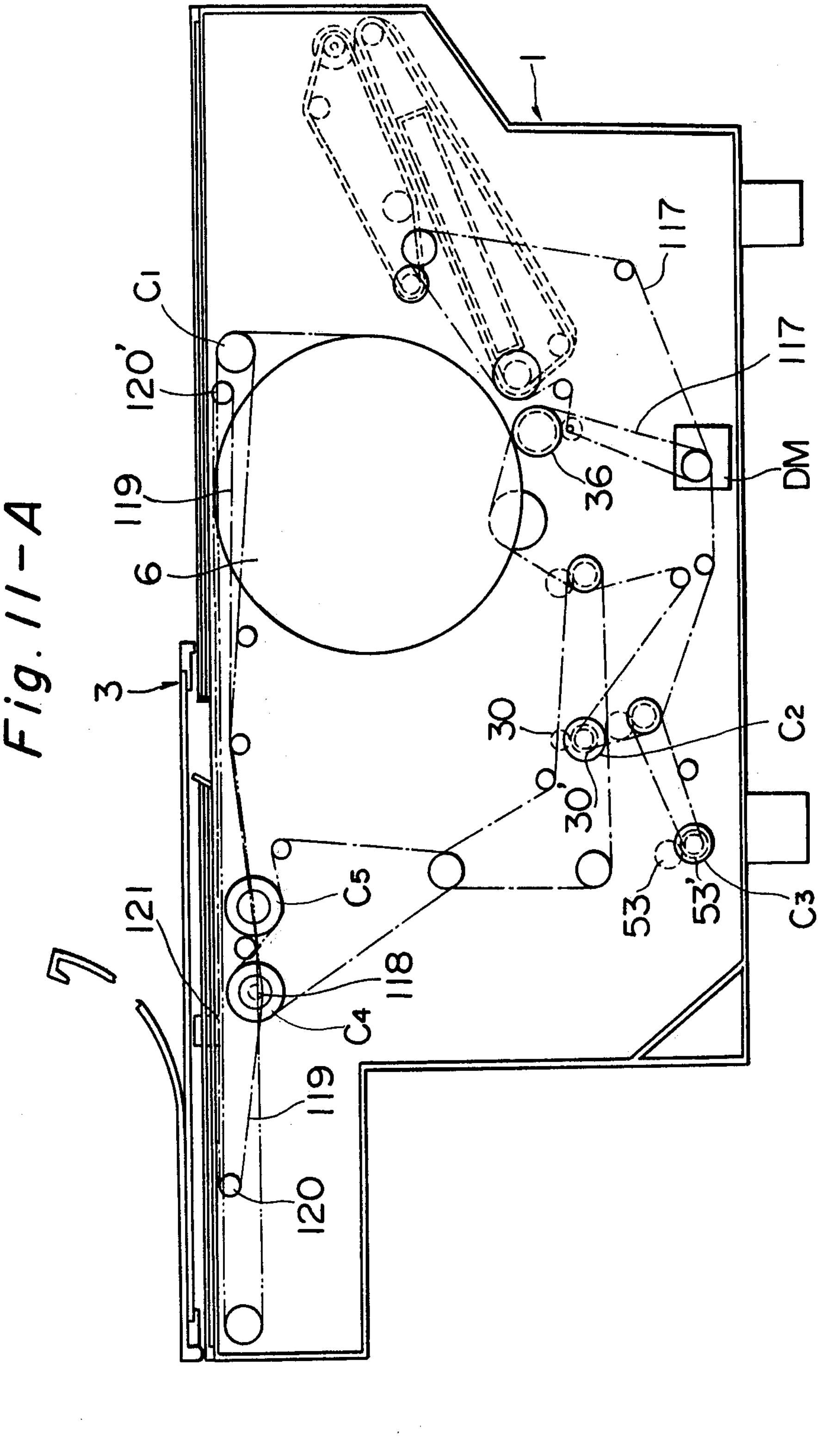
Fig. 11-A

Fig. 11-B
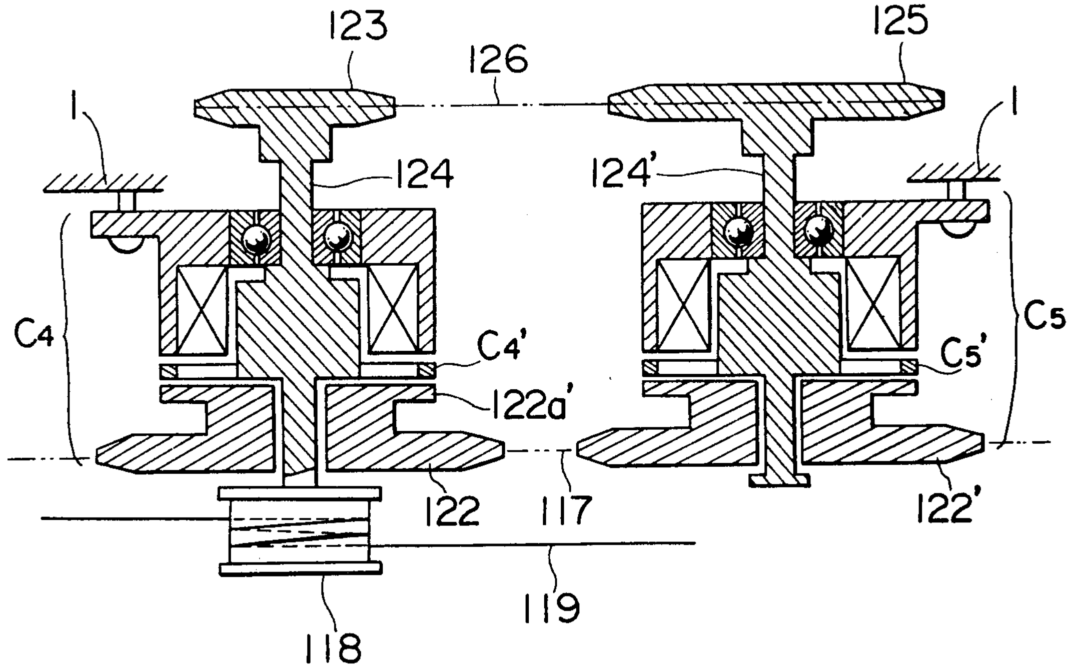
Fig. 11-C
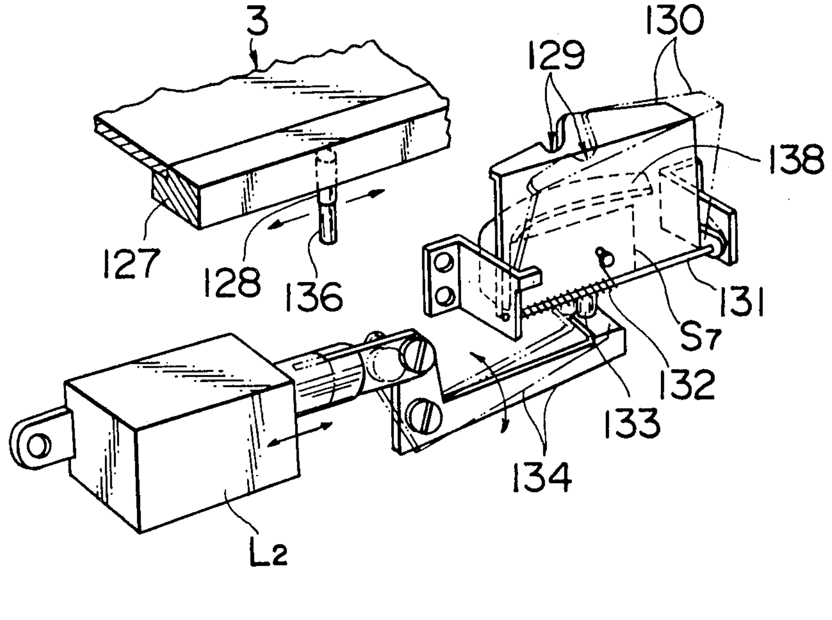

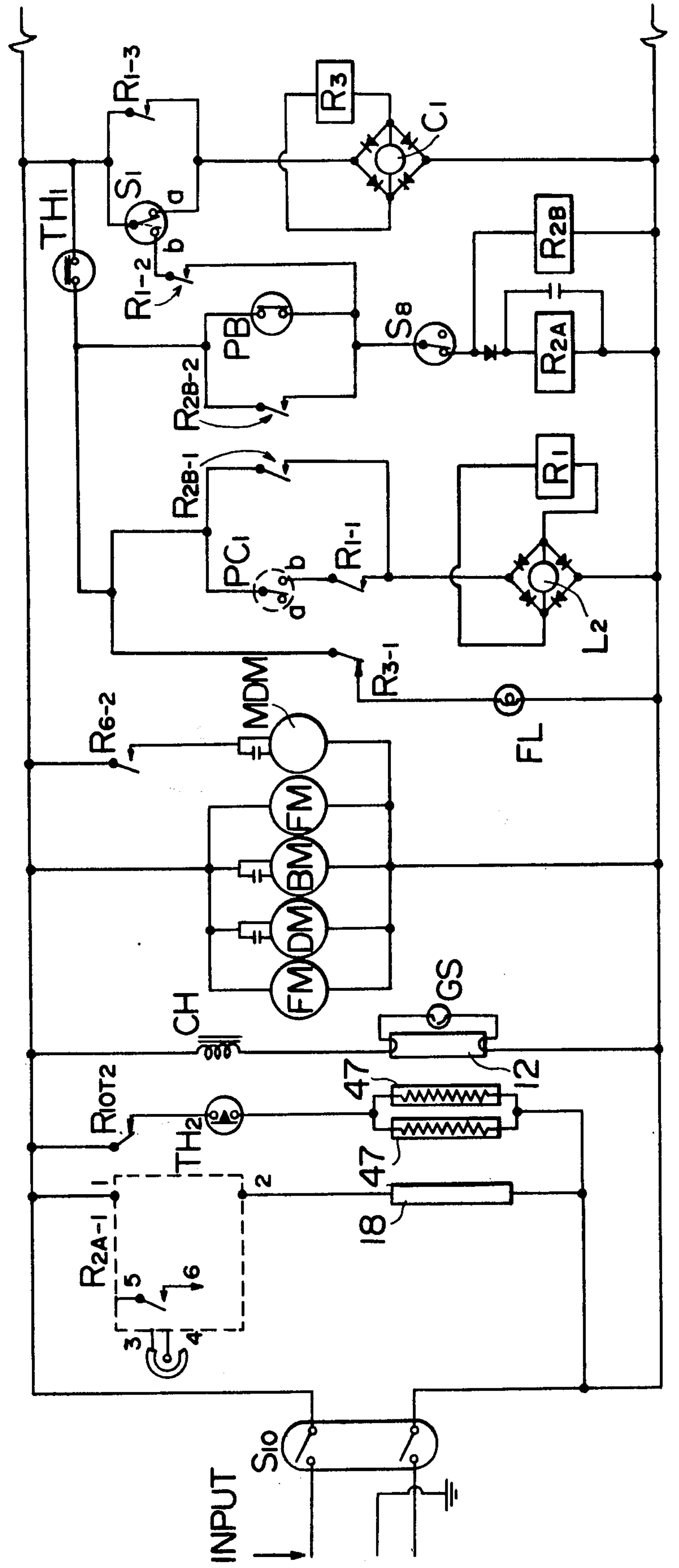
Fig. 12-A

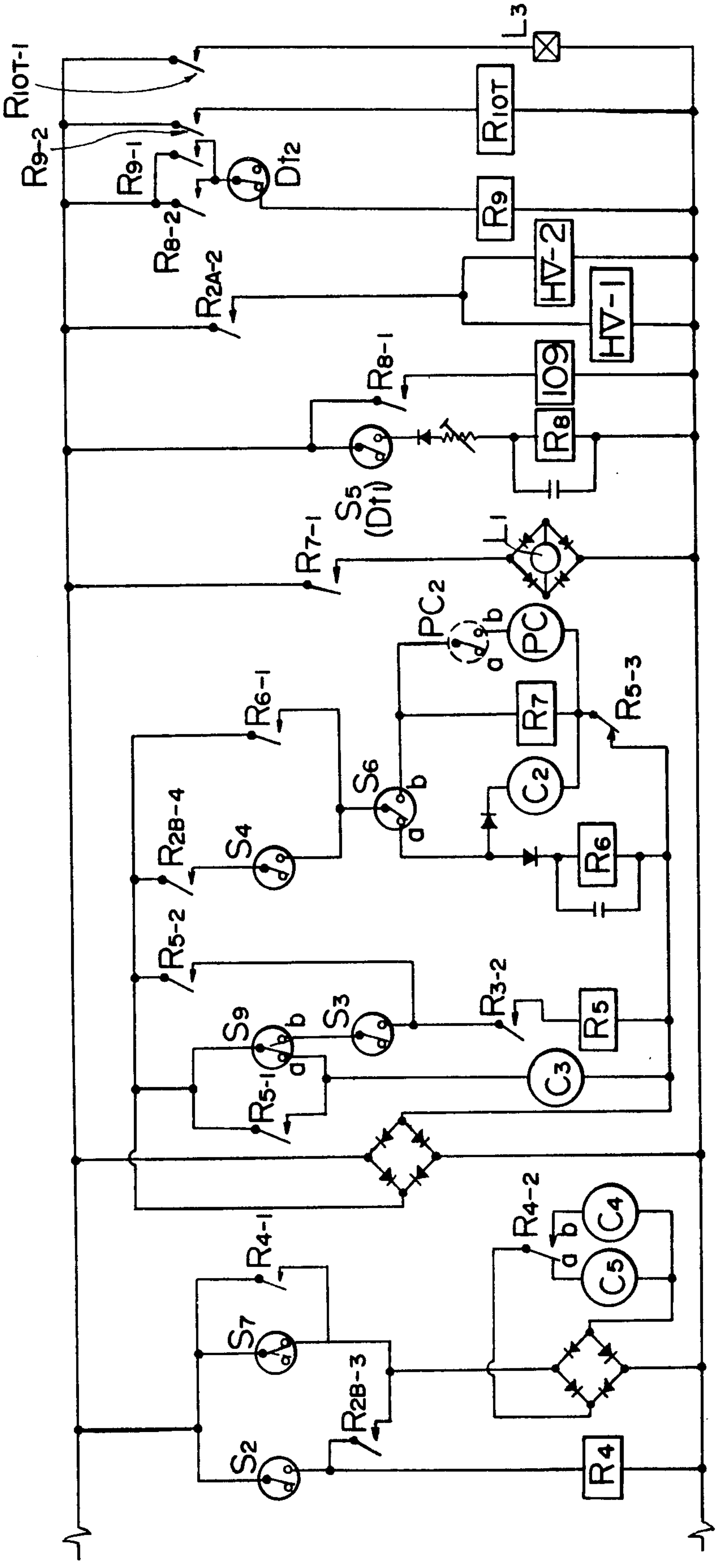
Fig. 12-B

COMPACT OPTICAL SYSTEM FOR AN ELECTROSTATIC PHOTOGRAPHIC COPYING APPARATUS

This is a division of application Ser. No. 399,516, filed Sept. 21, 1973, now U.S. Pat. No. 3,923,391.

SUMMARY OF THE INVENTION

This invention relates to an improvement in electrostatic photographic copying apparatus, and specifically to an improvement in an electrostatic photographic copying apparatus of the type equipped with a rotatable photosensitive drum.

The conventional electrostatic photographic copying apparatus of this type generally requires a synchronization control mechanism having a complicated structure in order to expose an image of an original a photosensitive drum synchronously with the rotation of the photosensitive drum, and in order to transfer paper synchronously with the rotation of the photosensitive drum. Furthermore, it is necessary to provide an electrical charging mechanism or an exposing section for an optical system, etc. along the circumference of the photosensitive drum. These provisions tend to increase the size of the apparatus.

It is an object of this invention to provide an electrostatic photographic copying apparatus in which the exposure of images can be effected synchronously with rotation of a sensitive drum by means of a device having a relatively simple structure.

Another object of this invention is to provide an electrostatic photographic copying apparatus in which the photosensitive drum and a transfer paper can be moved in exact synchronization with each other by a device of having a relatively simple structure.

Still another object of this invention is to provide an electrostatic photographic copying apparatus which includes a cut length adjusting device having a relatively simple structure whereby a continuous web of transfer paper can be cut exactly according to the required copying length of the original.

A further object of this invention is to provide an electrostatic photographic copying apparatus which is relatively compact.

According to this invention there is provided an electrostatic photograpic copying apparatus comprising a frame member having a transparent plate on which an original to be copied is placed a rotatable photosensitive drum having electrostatic photographic material on its periphery, an optical system for projecting an image of the original onto the surface of the photographic material, an image-forming zone disposed exteriorly of, and alongside, the periphery of said photosensitive drum for forming on said sensitive material an electrostatic latent image corresponding to the image of the original or a developed image corresponding to the latent image, a transfer zone for transferring said image to a transfer paper, and a transfer paper forwarding system for feeding the transfer paper on which the image has been transferred to a discharge end through a desired treating zone.

This invention can be applied to any electro-static photographic copying machine of the type in which a photosensitive drum is provided in a machine housing and transfer paper is brought into contact with the photosensitive drum to thereby transfer the image from the photosensitive drum to the transfer paper. For instance, this invention can be applied to either a copying machine of the so called original-moving, slit-exposure type in which an original to be copied is supported on a transparent plate mounted movably in the machine housing and an optical system is fixed in the housing, or the so called optical system-moving type in which an original is supported on a transparent plate fixed in the machine housing, while the optical system is moved to effect the slit exposure. In addition, this invention can be applied to a copying machine of the so called static image-transferring type in which an electrostatic image is formed on the surface of a photosensitive layer of a photosensitive drum, transferred to transfer paper and then visualized, or to a copying machine of the so called toner image-transferring type in which an electrostatic image formed on the surface of a photosensitive drum is developed with a toner and the toner image is transferred to transfer paper and, if required, fixed.

This invention can also be applied to a copying machine of the type in which transfer paper is fed in separate sheets or from a web-like form as withdrawn from a paper roll. For instance, this invention can be applied to a copying machine of the type in which a container or cartridge of transfer paper sheets is provided on one end wall of the machine housing and transfer paper sheets are automatically fed from such container or cartridge, or to a copying machine of the type in which transfer paper sheets are manually fed into a passage for transportation of transfer paper sheets.

Accordingly, this invention will be described hereinafter mainly with reference to embodiments in which this invention is applied to a copying machine of the original-moving, toner image-transferring type, but it must be noted that this application is not limited to such application.

This invention will now be illustated in more detail by reference to embodiments shown in accompanying drawings.

FIG. 8-A is a simplified side view of the transfer apparatus used in the copying machine of this invention.

FIG. 8-B is an enlarged sectional side view of the fixation zone of the copying machine of this invention.

Figure 9:
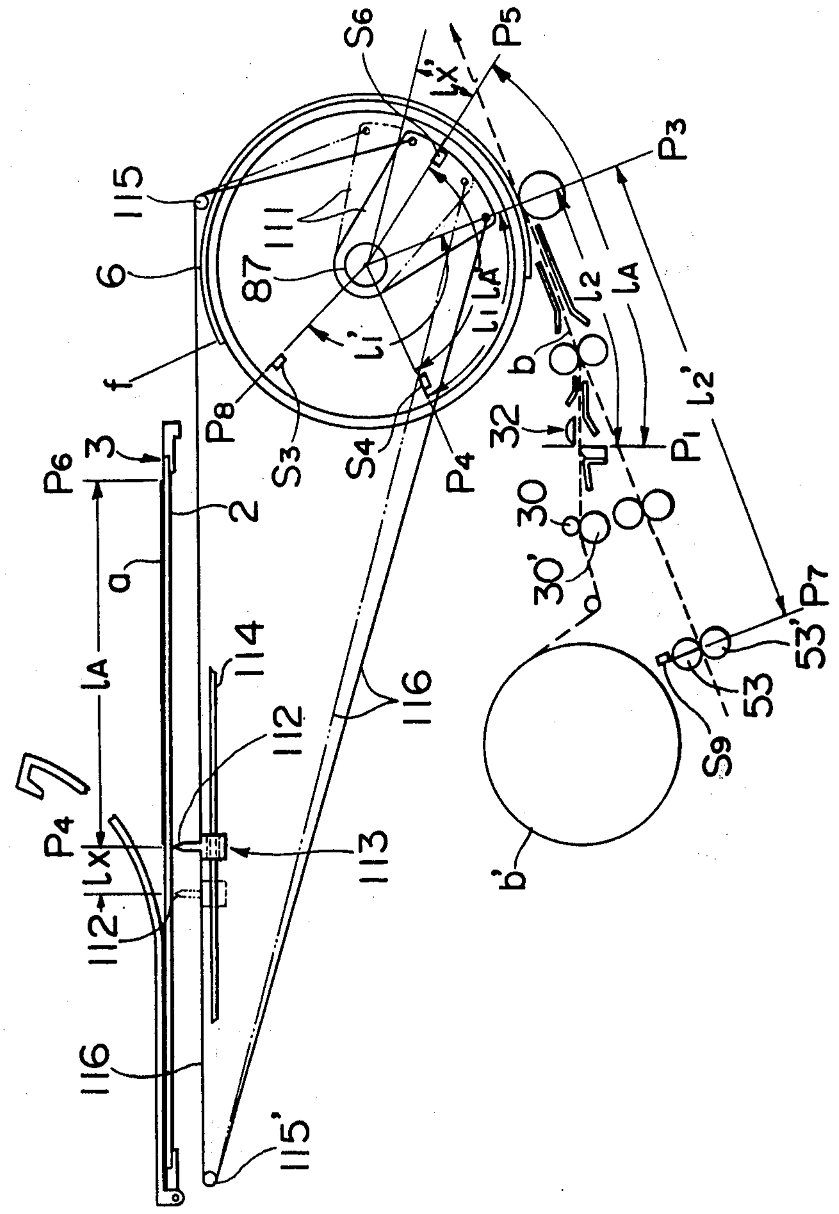

FIG. 9 is a diagram illustrating the principle of the copying machine of this invention.

Figure 10:
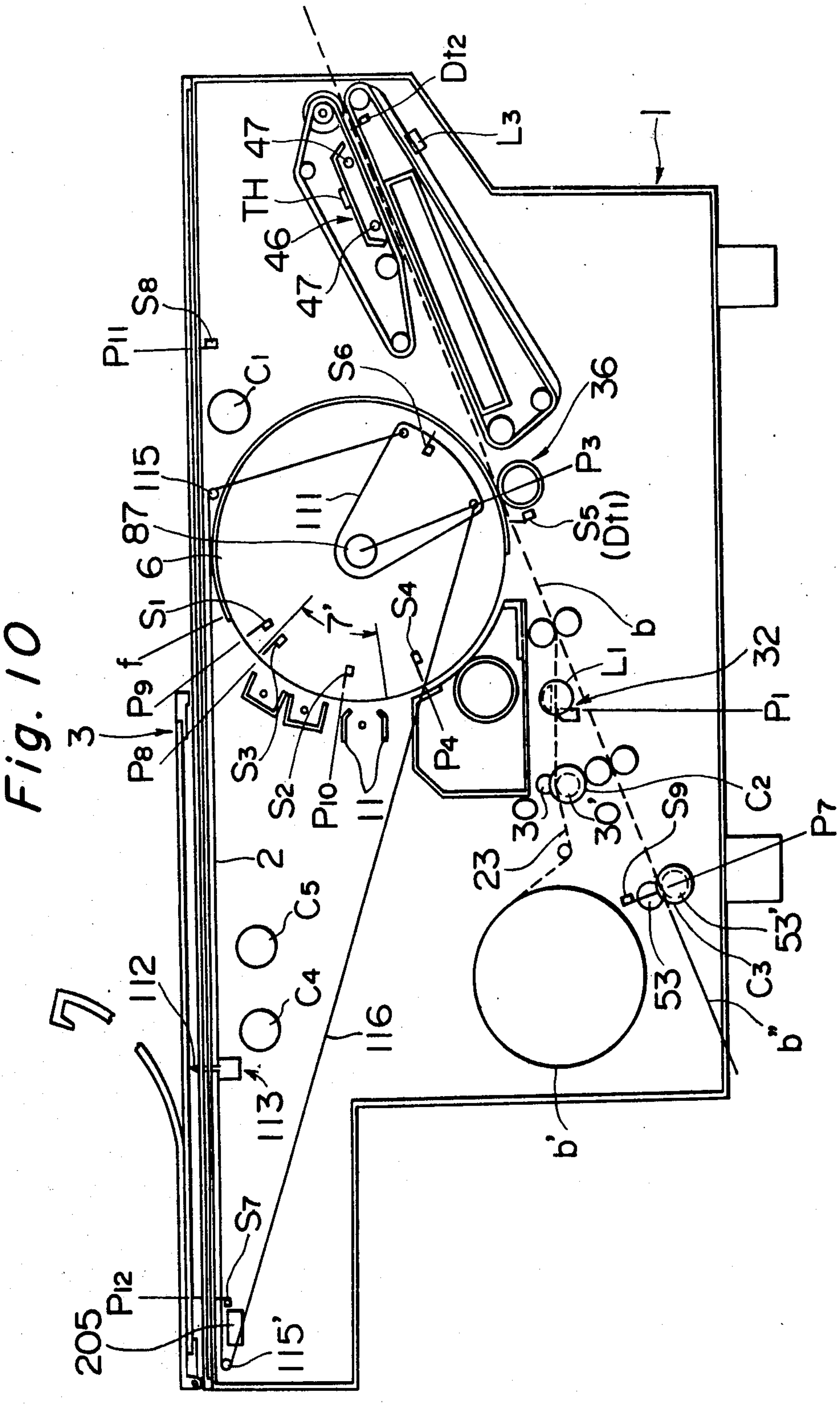

FIG. 10 is an arrangement view of various control mechanisms used in the copying machine of this invention.

FIG. 11-A is an arrangement view showing the driving system of the copying machine of this invention.

FIG. 11-B is a sectional view showing the system for driving the moving frame.

FIG. 11-C is a perspective view illustrating the restraint mechanism for the moving frame.

FIG. 12-A and 12-B are wiring diagrams of the electric circuit of the copying machine of this invention.

ENTIRE STRUCTURE

In FIG. I illustrating an outline of the entire arrangement in the electrostatic photograhic copying machine of this invention, a transparent plate 2 is mounted in the upper portion of a housing 1 to support thereon an original *a* to be copied. This transparent plate 2 is supported by a moving frame 3 capable of moving reciprocatingly in the horizontal direction and an original-pressing flexible plate 4 is attached to the moving frame 3 so that it can cover the transparent plate 2. In the interior of the housing 1, a photosensitive drum 6 having on the surface thereof a electrostatic photosensitive layer 5 is rotatably mounted. This photosensitive layer 5 may be any of a monolayer photosensitive plate formed by applying an inorganic photoconductor such as selenium, zinc oxide, cadmium sulfide, or cadmium selenide or an organic photoconductor such as polyvinyl carbazole, optionally together with a binder, on a substrate such as a metal plate or a paper rendered electrically conductive, a multilayer photosensitive plate formed by laminating a plurality of photoconductor layers or a sandwich-type multilayer photosensitive plate forming by inserting a photoconductor layer between an insulator layer and a conductor layer.

An image-forming zone 7 and a transfer zone 8 are grouped along the peripheral surface of the photosensitive drum 6. In the embodiment shown in FIG. 1 where a sandwich-type multilayer photosensitive plate forming by inserting a photoconductive layer between an insulating layer and a conductive layer is employed and the toner image transfer is effected, the image-forming zone 7 comprises a static latent image-forming area including a preliminary electrification mechanism 9 for erasing the charge remaining on the surface of the photosensitive layer, a primary electrification mechanism 10 for charging the surface of the photosensitive layer with a specific polarity, a secondary electrification and simultaneous exposure mechanism 11 for effecting the secondary electrification while an image is being exposed on the primarily electrified photosensitive layer and an exposure mechanism 12 for exposing to light the entire surface of the secondarily electrified and image-light-exposed photosensitive layer, and a developing area including a development mechanism 13 for developing the electro-static latent image with a toner powder. Each of the foregoing electrification mechanisms includes a corona wire on which a high voltage is applied, and the photosensitve layer is electrified by the corona discharge from this corona wire. The secondary electrification and simultaneous exposure mechanism 11 comprises an optical passage 14 connecting the photosensitive layer 5 optically with an opening for exposing the photosensitive layer to light, and a corona wire 15 in said optical passage 14, on which a high voltage is applied. The voltage to be applied on the corona wire 15 of the secondary electrification and simultaneous exposure mechanism 11 may be a direct current voltage of a polarity reverse to the polarity of the primary electrification, an alternating current voltage or an asymmetric alternating current voltage.

The toner powder development mechanism 13 may be of any desired type such as, for example, a magnetic brush type, a cascade type or a powder cloud type.

When the photoconductive layer 5 is composed of a monolayer photosensitive plate, the charging element 15 of the secondary electrification and simultaneous exposure mechanism 11 and the entire surface exposure mechanism 12 may be omitted. Furthermore, where the electro-static image on the photosensitive layer 5 is directly transferred to transfer paper (in the case of electro-static image transfer), the development mechanism 13 need not be provided along the periphery of the photosensitive drum 6.

An optical system indicated as a whole by reference numeral 16 is provided to project an image of the original *a* supported on the transparent plate 2, onto the photosensitive layer 5 in the above-mentioned image-forming zone. This optical system 16 comprises an opening 17 mounted in the upper portion of the housing 1 to expose the original to light, a light source 18 for illuminating the original *a* to be copied, a photosensitive layer-light exposing opening 19 provided in the vicinity of the photosensitve layer 5 of the photosensitive drum in the image-forming zone 7, and a group of reflex mirrors 20, 21 and a mirror lens 22 provided to connect optically the original-light-exposing opening 17 with the photosensitive layer-light-exposing opening 19 and to form a reverse image of the original *a* to be copied on the photosensitive layer 5.

Along the periphery of the photosensitive drum 6, the transfer zone 8 is disposed in succession to the image-forming zone 7. In the housing 1 a passage for transfer paper *b* (indicated as a whole by reference numeral 23) is provided so that said passage is circumscribed with the photosensitive drum 6 in the transfer zone 8. At the upstream end of this transfer paper passage 23, a transfer paper feed mechanism is mounted. For instance, in the embodiment illustrated in FIG. 1, a roll stand 25 supported rockably on the machine housing by means of a fulcrum 24 is mounted on the upstream end of the transfer paper passage 23, and a shaft 28 of a reel 27 is removably and rotatably mounted on a fitting recess 26 formed on the upper end of this roll stand 25.

Downstream of the reel 27, there are provided both a guide roller 29 and a pair of driven feed rollers 30, 30' provided with a roll paper feeding clutch C2 in order to introduce transfer paper from a transfer paper roll *b'* wound on the shaft of the reel 27. A pair of transfer paper-transporting rollers 31, 31' which are normally driven are disposed between the feed rollers 30, 30' and the transfer zone 8, and a transfer paper-cutting mechanism 32 is mounted between the feed rollers 30, 31' and the transfer paper-transporting rollers 30, 31'.

This transfer paper-cutting mechanism 32 includes a stationary blade member 33 and a rotary blade member 34. The rotary blade member 34 is rotated by excitation of a cutter solenoid and cuts transfer paper *b* passing through the stationary blade member 33 and rotary blade member 34. Accordingly, the position (P1) shown in FIG. 9 and 10 for actuation of the transfer paper-cutting mechanism is the position of the upper edge of the stationary blade member 33. In the non-actuated state, the blade of the rotary blade member 34 is postioned on the upper side of the transfer paper passage between the feed rollers 30, 30' and the transporting rollers 31, 31' so that it does not intersect the transfer paper passage. In this invention, as will be detailed hereinafter, the position of the leading edge of transfer paper at the beginning of feeding and the position for stoppage and standing-by of the leading edge of roll-like transfer paper cut are set at the position (P1) for actuation of the transfer paper-cutting mechanism. In order to attain this feature, upper and lower guide plates 35*a* and 35′*a* are disposed between the cutting mechanism 32 and feed rollers 30, 30′, and another upper and lower guide plates 35*b* and 35′*b*, between the cutting mechanism 32 and transporting rollers 31, 31′, so that lower guide plates 35′*a* and 35′*b* are positioned in an almost straight line with the upper edge of the stationary blade member 33 and the upper guide plates 35*a* and 35*b* are positioned in an almost straight line with the lower edge of the rotary blade member 34 in the non-actuated state. The foregoing structures makes it possible to conduct the transportation and stoppage of transfer paper smoothly without occurrence of paper jamming or other troubles. Further downstream of the normally driven, transporting rollers 31, 31′, there are provided upper and lower guide plates 35*c* and 35*c′* to introduce transfer paper *b* into the transfer zone 8.

Figure 1:
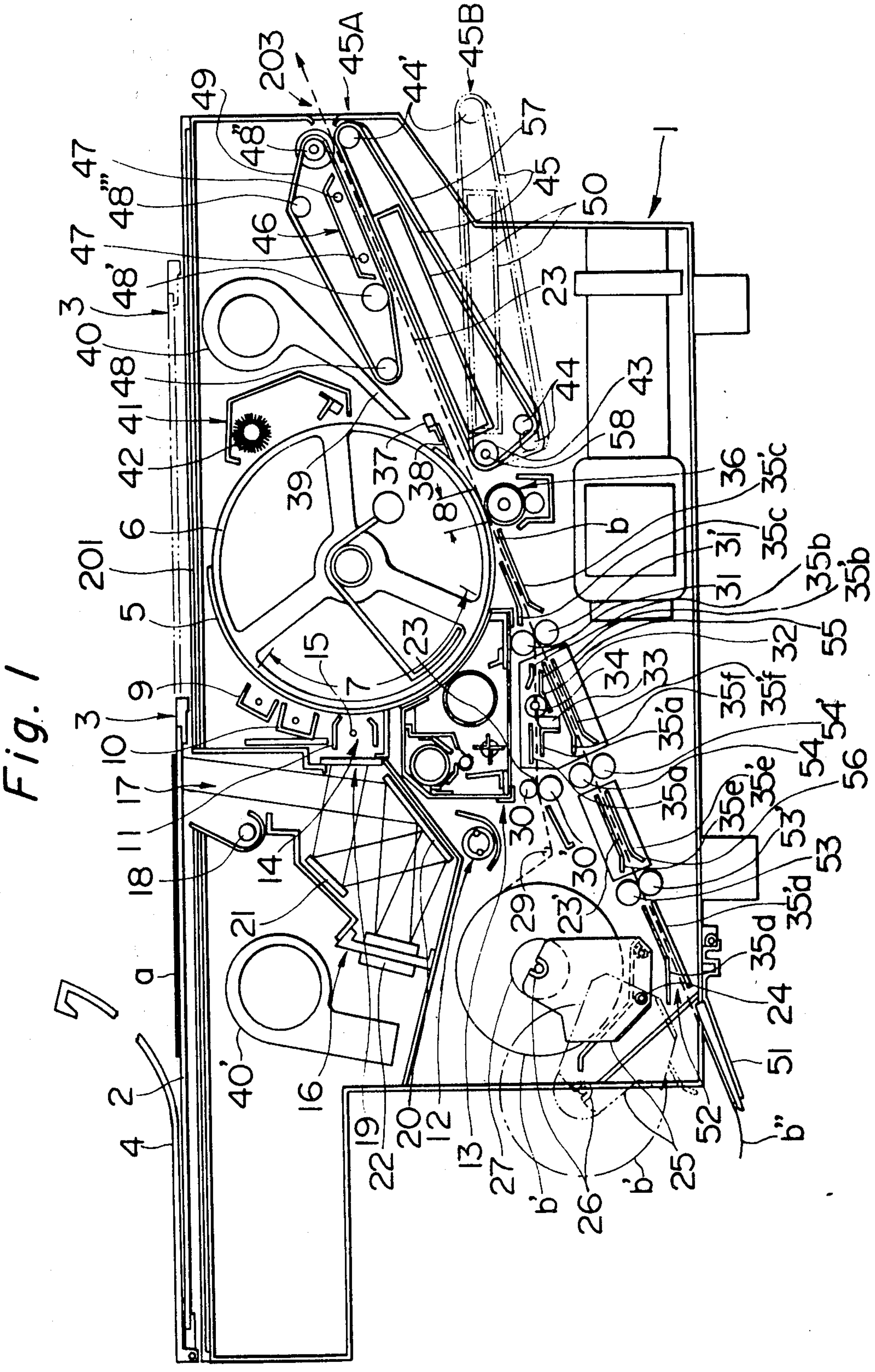
FIG. 1 is an arrangement diagram illustrating the outline of the copying machine of this invention.

In the embodiment of the copying machine in FIG. 1, a paper feed mechanism for feeding a sheet-like transfer paper *b″* is provided independently of the paper feed mechanism for feeding a roll-like transfer paper. More specifically, a paper-feeding table 51 is provided openably or removably at the end of the machine housing 1 at the upstream end of the transfer paper-transporting passage 23′ to feed a sheet-like transfer paper *b″*, and at the tip of this paper-feeding table, there are mounted a paper sheet feeding opening 52 and upper and lower guide plates 35*d* and 35′*d* connected to this opening 52. A pair of paper sheet feed driven rollers 53, 53′ provided with a sheet paper feed clutch C3 (shown in FIG. 11-A) are mounted downstream of the upper and lower guide plates 35*d*, 35*d′*.

Between said sheet paper feed rollers 53, 53′ and the abovementioned transfer paper-transporting rollers 31, 31′, upper and lower guide plates 35*e* and 35′*e*, a pair of sheet-transporting rollers 54, 54′ and upper and lower guide plates 35*f* and 35*f′* are mounted to transport sheet-like transfer paper *b″* to said rollers 31, 31′.

In the copying machine illustrated in FIG. 1 the above-mentioned transfer paper-transporting passage 23 is circumscribed with the photosensitive drum 6 in the transfer zone 8 and forms almost one plane extending from sheet-like transporting means 53, 53′ to the above-mentioned fixation zone 46. This passage 23 for feeding roll-like transfer paper *b′* joins a passage 23′ for feeding sheet-like transfer paper *b″* in the position of transporting rollers 31, 31′ disposed upstream of the transfer zone 8, and transfer paper is then forwarded through the common transfer paper-transporting passage 23, extending in a straight line. When the passage for transporting a sheet-like transfer paper is thus disposed in a straight line in the machine housing and is circumscribed with the photosensitive drum 6 in the transfer zone 8, even if a very thin or soft paper, cloth, film or foil is used as the sheet-like transfer paper *b′*, paper jamming can be greatly reduced and the copying operation can be accomplished very assuredly.

Further, if paper jamming is caused to occur in the transfer paper-transporting passage of the copying machine, removal of the jammed paper can be facilitated by disposing openably or dismountably each of members positioned in the transporting passage except for some pairs of transporting rollers. For instance, the roll-like transfer paper-cutting mechanism 32 and guide plates 35*a*, 35′*a*, 35*b*, 35*b′* positioned between the roll-feeding rollers 30, 30′ and transporting rollers 31, 31′, and guide plates 35*f*, 35*f′* positioned between the transporting rollers 54, 54′ and transporting rollers 31, 31′ are integrally attached to a supporting frame 55 mounted detachably on the frame of the machine housing 1. Thus, the jamming of paper can easily be inspected by dis-mounting the foregoing members together with the supporting frame 55. Similarly, guide plates 35*e*, 35′*e* positioned between the sheet-like transfer paper-transporting rollers 53, 53′ and the transporting rollers 54, 54′ are integrally attached to a supporting frame 56 mounted dismountably on the frame of the machine housing 1, so that these plates can be dismounted from the machine housing together with the supporting frame 56. The foregoing structure makes it possible to check jamming of transfer paper in the transfer paper-transporting passage with ease.

In the transfer zone 8, a transfer mechanism 36 is disposed to bring transfer paper *b* into contact with the photosensitive layer 5 of the photosensitive drum 6 and thereby transfer the image onto the transfer paper. This transfer mechanism 36 is construction of a transfer roller alone or in combination with a corona discharge mechanism. For instance, when the image to be transferred is an electrostatic image, it may be transformed onto transfer paper merely by contacting it with the electrostatic image-carrying photosensitive drum by means of a roller. Of course, in this case, the transfer of the electrostatic image can be accomplished effectively by forming an electric field between the transfer roller and the substrate of the photosensitive drum or by effecting the corona discharge from the back face of transfer paper. When the image to be transferred is a toner image, it may be transferred onto transfer paper by contacting it with the toner image-carrying photosensitive drum by means of the transfer roller or by static force and forming an electric field between the transfer roller and the substrate of the photosensitive drum or effecting the corona discharge from the back face of the transfer paper.

The transfer paper-transporting passage indicated as a whole by reference numeral 23 extends downstream of the transfer zone 8. On the discharge side the transfer zone of, and adjacent to the photosensitive drum 6 there is provided a peeling mechanism 37 which removes transfer paper *b* from the photosensitive layer 5 of the photosensitive drum 6 and directs it toward the said transporting passage. This peeling mechanism 37 is provided with a peeling nail 38 disposed so that its leading edge is brought into contact with the photosensitive layer of the said photosensitive drum. Said peeling projection 38 peels off the leading edge of transfer paper *b* from the photosensitive layer surfaces and guides transfer paper *b* to the transfer paper-transporting passage. A fan 40 provided with a projection nozzle 39 directed toward the peeling projection 38 is disposed to assist peeling of the transfer paper *b* from the photosensitive layer surface and introduction of transfer paper *b* into the transfer paper-transporting passage and to accomplish these operations stably and assuredly.

In position spaced from the peeling mechanism 37 along the direction of rotation of the rotary drum 6, there may be provided a cleaning mechanism 41 to clean the photosensitive layer of the photosensitive drum 6 by removing the toner from the surface thereof. This cleaning mechanism 41 comprises a roller 42 provided with a rubber or brush surface which is rotated while in contact with the photosensitive layer of the drum 6. In the case of electro-static image transfer, of course, this cleaning mechanism may be omitted.

The transfer paper-transporting passage 23 extending to the downstream of the transfer zone 8 is provided with pairs of driven rollers or one or more endless belts and it transports transfer paper through a subsequent treating zone. The treating zone may be an image-fixing zone, when a toner image is transferred and may include development and fixing zones static image.

In the embodiment shown in FIG. 1, an endless belt 45 supported and driven by a driving pulley 43 and driven pulleys 44, 44' is mounted to define the lower side of the transfer paper-transporting passage 23. On the upper side of the transfer paper-transporting passage 23, a fixation mechanism 46 is disposed to fix the toner image on transfer paper *b*. This fixation mechanism 46 includes an infrared lamp or electric heater 47 and the fixation of the toner image is accomplished by melt-bonding it to transfer paper with heat from the heater. In order to prevent transfer paper from making direct contact with the fixation mechanism, on the upper side of the transfer paper-transporting passage 23. The guilding belt 49 is driven and supported by a driving pulley 45 and driven pulley 48', 48'', 48'''. It is also possible to position pulleys 44' and 48' supporting belts 45 and 49 near the discharge end 203 of the passage 23 in a manner such that the pulleys 44' and 48' contact each other through the belts, whereby transfer paper on which the image has been formed can be discharged assuredly from the fixing zone. In addition, on the lower side of the transfer paper-transporting passage 23, a suction mechanism 50 may be provided to such transfer paper through the endless belt 45, whereby transfer paper will adhere closely and fixedly to the endless belt 45. In this case, the guiding belt 49 may be omitted. Instead of a combination of the infrared lamp or electric heater with transfer paper-transporting belts, a known combination (not shown) of an iron roller and a pressing roller may be used as the fixation mechanism 46 without disadvantages.

As is shown in FIG. 1, it is preferred that the photosensitive drum 6 be located so that the uppermost part of its circumferential surface is in proximity to, and faces, the upper surface plate 201 of the machine frame 1. This is because by opening the upper surface plate 201, the inspection, repair, etc. of the photosensitive drum 6 can be very easily performed.

The transfer paper transporting passage 23 can be oriented substantially horizontally in the lengthwise direction of the machine or it may be oriented in a plane inclined with respect to the lengthwise direction of the machine. However, as is shown in FIG. 1, it is preferred that the transfer section 8 be located in a position which is at an angle exceeding 180° C. in the direction of rotation of the photosensitive drum from the uppermost part of the photosensitive drum. Furthermore, it is preferred that the transfer paper transporting passage 23 form an upwardly inclined plane ranging from the positions of transfer roller 33, 33' upstream of the transfer zone 8 to the discharge end 201 through the transfer zone 8. This is because in the case of a copying machine provided with a photosensitive drum, such numerous treating zones as preliminary electrification zone 9, primary electrification zone 10, secondary electrification and simultaneous exposure zone 11, exposure zone 12 and development zone 13 should be disposed alongside the peripheral surface of the photosensitive drum 6 from the transfer zone 8 in the direction opposite to the direction of rotation of the transfer drum 6, and only peeling zone 37 and cleaning zone 41 should be disposed along the periphery of the photosensitive drum 6 from the transfer zone 8 in the direction of rotation of the drum 6. As mentioned above the transfer paper-transporting passage 23 is provided to contact the photosensitive drum 6 in an upwardly inclined state. Consequently, a broad treating space can be obtained on the upstream side, that is the left side in FIG. 1, of the photosensitive drum 6. In addition to the above-mentioned various treating zones, the optical system and various paper feed mechanisms are provided above the feed side of the transfer zone 8. Only when the transfer paper-transporting passage is provided in the upwardly inclined state, it is possible to secure a space sufficient to house these mechanisms therein. Thus, in the embodiment of the copying machine of the invention illustrated in FIG. I, either the height or the length of the machine can be greatly shortened as compared with conventional copying machines of this type. Furthermore, since the transfer paper-transporting passage 23 is provided in the state upwardly inclined with respect to the direction of advance of transfer paper, a space sufficient for opening the endless belt 45 downwardly can be provided below the fixing zone and hence, removal of jammed paper can be accomplished with case.

The foregoing embodiment of the copying machine of this invention has the following particular structure.

OPTICAL SYSTEM

Figure 2:
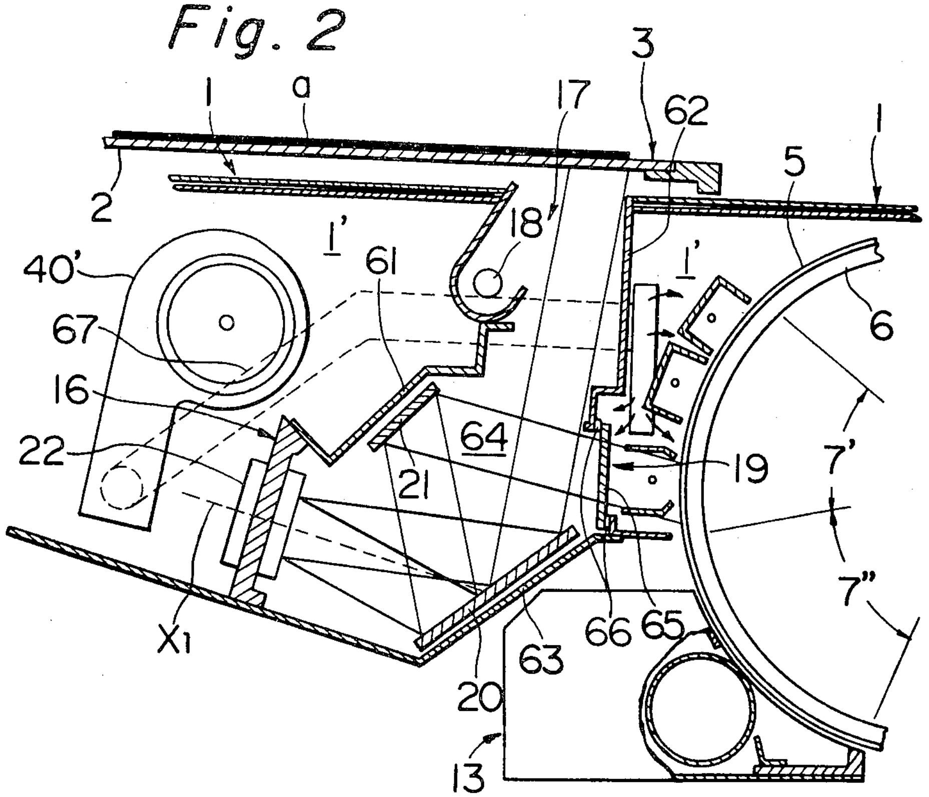
FIG. 2 is a sectional side view in which the optical system and static image-forming zone of the copying machine of FIG. 1 are illustratively enlarged.

As shown in an enlarged sectional side view of FIG. 2, the optical system of the copying machine comprises a light source 18 for light exposure, an opening 17 for exposing the original to light, two reflex mirrors 20 and 21, a mirror lens 22 and an opening 19 for exposing the photosensitive layer 5 to light, these members being disposed on partition walls 61, 62 and 63 or disposed so as to constitute at least part of these partition walls. The opening 17 for exposing the original to light is disposed in the upper portion of the machine housing 1 so that when a moving frame 3 is positioned at a point of initiation of light exposure, it can be optically connected to the standard end point of initiation of light exposure (position P6 detailed hereinafter) which is formed on a transparent plate 2 mounted on the moving frame 3. This opening 17 may be shielded by a transparent plate or it may be shielded by a transparent plate. The light source 18 for light exposure is disposed on one 61 of partition walls 61, 62 inserting the opening 17 therebetween, in the vicinity of said opening for exposing the original to light. Alternatively, the light source 18 may be disposed on both the partition walls 61 and 62. The opening 19 for exposing the photosensitive layer to light is disposed in the partition wall 62 positioned on the side of the photosensitive drum, and the first reflex mirror 20 is mounted on the partition wall 63 of the optical system while the second reflex mirror 21 and mirror lens 22 are disposed on the partition wall 61 positioned on the opposite side. The first reflex mirror 20 connects the opening 17 for exposure of the original optically with the in-mirror lens 22 and simultaneously connects the mirror lens 22 optically with the second reflex mirror 21. This second reflex mirror 21 is disposed in such a position that it connects the first reflex mirror 20 optically with the opening 19 for exposing the photosensitive layer to light. In order to attain the foregoing positional relationship in the optical system, it is preferred that the optical axis $x_1$ of the mirror lens 22 be inclined from the horizontal plane by a small angle $\theta_1$° (generally 5° to 20°) in the clockwise direction, and the first and second reflex mirrors 20 and 21 be deviated by an angle of $\theta_2$° (generally +5° to +20°) and $\theta_3$° (generally 0° to −15°) in a clockwise direction from the position at an angle of 45° to the horizontal plane in a counterclockwise direction.

In the optical system 16 of this embodiment, light projected from the light source 18 and reflected from an original *a* to be copied follows a first path and is reflected by the first reflux mirror 20 and propagated along a second path to the mirror lens 22. The light is then reflected from the surface of the mirror lens 22, and follows a third path that is reflected again from the first reflex mirror 20 along a fourth path which crosses the second path and is reflected from the and second reflux mirror 21 20 and 21 and propagated to the photosensitive surface 5 through the opening 19 for exposing the photosensitive layer to light. Thus an image of the original is formed on the photosensitive surface 5. As is seen from the foregoing explanation, in this optical system, by arranging the first and second reflex mirrors and the mirror lens in an optical chamber so that a specific positional relationship as mentioned above can be attained among these optical members, it is made possible to utilize the first-reflex mirror in a duplicate manner for reflecting and propagation of the light. As a result, a 4-fold optical passage for the reverse image can be formed by a minimum unit combination of two reflex mirrors and one mirror lens, and since the optical passage is of such 4-fold structure, the space for the optical system can be greatly reduced. Further, since the number of members constituting the optical system is very small, the angle determination in these members can be accomplished very easily. Preferably, the mirror lens 22 is mounted adjustably on the partition wall 61 to permit easy adjustment of the focal point of the optical system. By this contrivance, the focal point can be adjusted as desired by adjusting the mirror lens 22 even when the height of the transparent plate 2 for supporting an original to be copied or the position of the photosensitive layer on the surface of the photosensitive drum is varied.

In the embodiment illustrated in FIG. 2, the optical system 16 forms one chamber 64 substantially isolated from a static image-forming zone 7′ and a development zone 7″ which are disposed along the passage for movement of the photosensitive layer 5. More specifically, each member of the optical system 16 is disposed inside the partition walls 61, 62, 63 or mounted on such partition wall so that it will act as a part of the partition wall. The opening 19 for light-exposing the photosensitive layer is covered with a transparent plate 65 such as a transparent glass plate and is supported on partition side walls 62, 63 through a sealing packing 66. Accordingly, in the area of the opening 19 of the optical system 16, an optical connection is attained to the area of the photosensitive layer 5 to be exposed while the air current from the optical system chamber 64 is interrupted. Alternatively, air may be positively passed into the electrostatic image-forming zone 7′ by providing an exhaust port of an exhaust gas duct 67 of a fan 40′ on a side wall 1′ of the machine housing confronting the electrostatic image-forming zone 7′.

In an electrostatic photographic copying machine of the type wherein the development is effected using a toner powder, the developing zone is generally disposed just below the zone for forming an electrostatic image by electrification and light exposure. Therefore, operational troubles are brought about by scattering of the toner powder caused with rotation of the developing drum. When the side wall of the developing chamber is closely contacted with the photosensitive layer, the electrostatic image formed on the surface of the photosensitive layer is disturbed by friction. In order to prevent occurrence of this undesired phenomenon, a certain clearance should be formed between the side wall of the developing chamber and the surface of the photosensitive layer. However, if such clearance is formed, a fine powder of the toner is scattered from this clearance and adheres to the electrification and light exposure mechanisms of the electro-static image-forming zone, thereby contaminating these mechanisms. In the electrification zone, contamination is a special problem and is readily brought about by absorption of the toner powder toner by the influence of static electricity generated by corona discharge. Thus, the image is disturbed in the optical system by scattering of the toner powder and a normal discharge of the electrification mechanism is inhibited by the scattered toner powder.

In the embodiment illustrated in FIG. 2, the optical system 16 including lens, mirrors and the like is so constructed as to form one chamber and the area of the opening 19 for exposing the photosensitive layer to light is kept in the air-tight state by the transparent plate 65. Therefore, intrusion of the toner powder into the optical system can be effectively prevented. Furthermore, since air is positively blown into the static image-forming zone 7′ including the electrification and light exposure mechanisms and the pressure can be maintained in this zone 7′ at a level higher than in the developing zone 7″, scattering and intrusion of the toner powder into the electrostatic image-forming zone can be prevented effectively. Thus, in the embodiment of the copying machine illustrated in FIG. 2, the need to frequently clean the electro-static image-forming zone can be greatly reduced and clear copy sheets can be obtained stably even if the copying machine is operated for a long period of time.

DEVELOPING DEVICE

Figure 3:
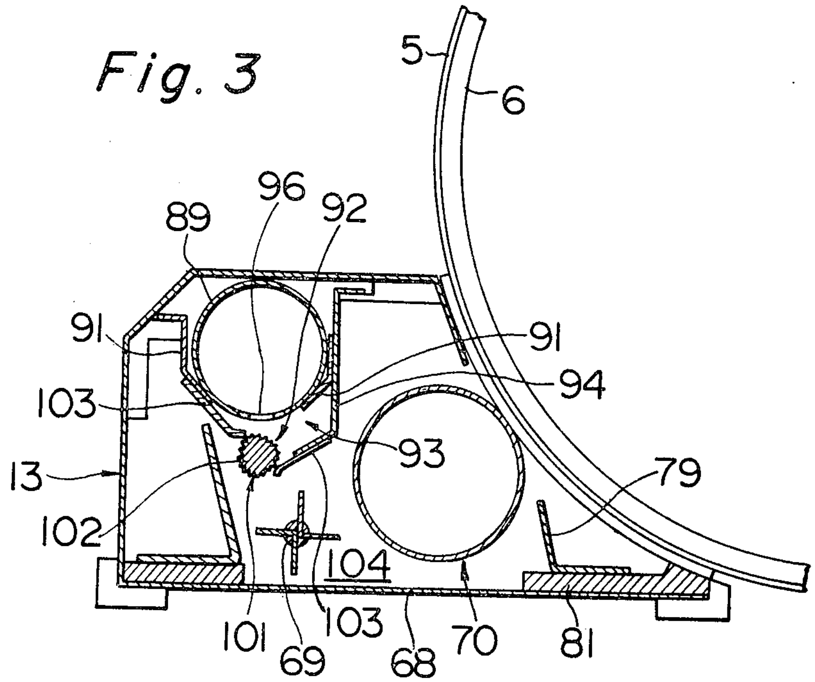
FIG. 3 is an enlarged sectional side view illustrating an embodiment of the developing apparatus usable in the copying machine of this invention.

The developing device used in the copying apparatus of this invention has such a structure as illustrated in FIGS. 3 to 7. In FIG. 3, the developing device shown generally at 13 includes a developing vessel 65 containing a developer, a stirring member 69 for stirring the developer, and a magnetic brush member 70 provided within the developer vessel 68. The developer may be composed of a toner powder and a magnetic carrier, or of a toner having magnetic properties. When the developer is composed of the toner powder and magnetic carrier, the toner powder is rubbed and electrically charged as a result of being stirred by the stirring member 69.

Figure 4:
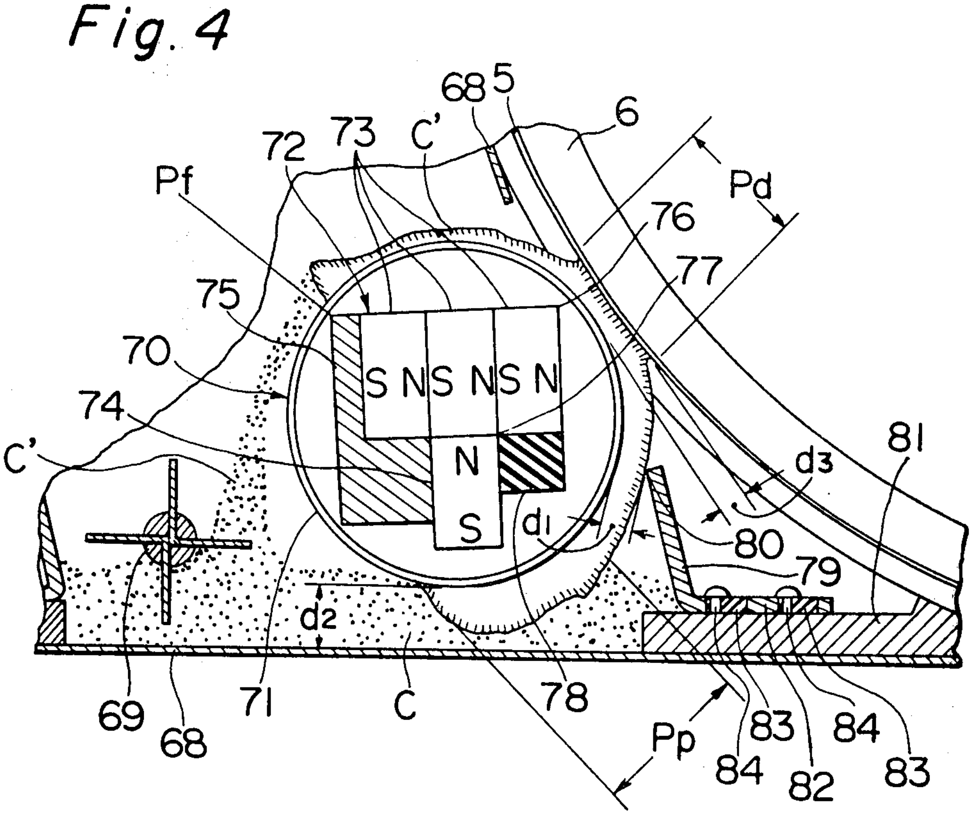
FIGS. 4 and 5 are diagrams illustrating the arrangement and function of the magnet mechanism used in the developing apparatus of FIG. 3.

As is illustrated in FIG. 4, this magnetic brush member 70 includes a development sleeve 71 which is hollow and composed of a non-magnetic substance and a magnet means 72 disposed in the stationary state in said development sleeve 71. The magnet means 72 comprises a plurality of magnets 73 and 74 and a magnetism-intercepting member 75, which are provided to satisfy the following positional and arrangement requirements. The magnet forms a magnetic field sufficient to attract a developer to the sleeve surface and to retain the developer there in a zone ranging in the rotating direction of the sleeve from the position $P_p$ of pumping up the developer to the developing position $P_d$, and the magnetic-intercepting member is disposed so that it weakens the magnetic field in at least a part of a zone ranging in the rotating direction of the sleeve from the developing position $P_d$ to the position $P_p$ of pumping up the developer. Preferably, the magnetic field formed by the magnet has a flux ($f_1$, for example, about 1000 gauss) suitable for taking up the developer C at the pumping position $P_p$ under the sleeve 71, a flux ($f_2$, about 700 gauss) substantially normal to the circumferential surface of the sleeve at the developing position $P_d$, and a concentrated flux ($f_3$) along the circumferential surface of the sleeve ranging from the developer-pumping position $P_p$ to the developing position $P_d$.

For example, in the embodiment illustrated in FIG. 4, a first magnet (i.e., a magnet brush-forming magnet 73) is disposed so that one end 76 of one pole N (or S) is directed to the developing position $P_d$. In the embodiment shown in FIG. 4, the magnetic brush-forming magnet 73 is composed of a plurality of rectangular magnet pieces bonded to one another, but of course, the magnet 73 may be composed of a single magnet piece.

On the side of the other end 77 of the magnetic brush-forming magnet 73, a secondary magnet (i.e., a developer-pumping magnet 74) is disposed so that its pole S (or N) is directed to the developer-pumping position $P_p$. In this case, it is indispensable that the polarity of the acting pole of the magnetic brush-forming magnet 73 is contrary to the polarity of the acting pole of the developer-pumping magnet 74. Needless to say, this developer-pumping magnet 74 may be formed integrally with the brush-forming magnet 73. It is preferred that those magnetic brush-forming magnet 73 and developer-pumping magnet 74 are so arranged that their exciting directions are substantially perpendicular to each other.

The magnetism-shielding member 75 composed of a non-magnetized magnetic material (for example, non-magnetic iron) is provided, as shown, so that it weakens a magnetic field formed between the other pole S (or N) of the magnetic brush-forming magnet 73 and the developer-pumping magnet 74 in the rotating direction of the sleeve.

By adapting the above-mentioned arrangement of the magnets 73 and 74 and the magnetism-shielding member 75, the magnetic flux density can be heightened especially at the developing zone Pd to which the end 76 of the pole N of the magnetic brush-forming brush 73 is directed and at the developer-pumping position $P_p$ to which the pole S of the developer-pumping magnet 74 is directed. Furthermore, at the area of the developing position P*d*, a magnetic flux substantially vertical to the circumference of the sleeve is formed, and moreover, a flux of a relatively high density, i.e., a concentrated flux, is formed between the pole H of the magnet 73 and the pole S of the magnet 74, namely between the developer-pumping position $P_p$ and the developing position Pd, along the circumference of the sleeve. Since the polarity of the other pole S of the magnetic brush-forming magnet 73 is the same as the polarity of the acting pole S of the developer-pumping magnet 74 and since the pole S of the magnet 73 and the space of portions of the magnet 74 other than the acting pole S are covered and filled with the magnetism-shielding member 75, the magnetic flux passes the interior of the magnetism-shielding member 75 between the pole S of the magnet 73 and the magnet 74, namely between the carrier-peeling position Pf located on the opposite side of the developing position Pd and the developer-pumping position $P_p$. Hence, the magnetic flux density is extremely low on the circumference of the sleeve in such area.

In conducting the developing operation, the magnet mechanism 72 is arranged fixedly in the state shown in FIg. 4, and when the sleeve 71 is rotated in the counter-closkwise direction, the developer *c* is applied to the peripheral face of the sleeve at the developer-pumping position, whereby pumping of the developer is accomplished. The developer *c* is transported to the developing zone Pd while being carried on the circumference of the sleeve. At the developing zone P*d*, a magnetic brush of a high density uniformly extending vertically from the peripheral face of the sleeve is formed, and a close contact of this magnetic brush with the electrostatic image carried on the photosensitive layer 5 can be ensured. Thus, the electro-static image on the photosensitive layer is developed with the charge toner retained by the magnetic carrier. The developer which has completed the developing operation is rotated in the counterclockwise direction from the developing position Pd while being carried on the circumference of the sleeve and is transported to the carrier-peeling position P*f* located on the opposite side of the developing position P*d*. At this carrier-peeling position P*f*, the the magnetic flux density on the peripheral face of the sleeve is drastically lowered and the developer *c'* transported while being retained on the circumferential face of the sleeve is peeled off therefrom by the gravity and centrifugal force and is allowed to fall down on the bottom of a developer vessel 68. At the point of falling of the developer *c'*, there is provided a stirring mechanism 69 which rotates in the direction opposite to the direction of rotation of the sleeve, namely in the clockwise direction. This stirring mechanism 69 is mounted to stir the developer *c'* having a lowered concentration of the toner powder with a freshly supplied toner powder and to feed a fresh supply of the developer to the developer-pumping position after adjustment of the toner concentration. In the development apparatus of this embodiment having the foregoing structure, it is possible to form a clear tone image stably even after the operation has continued for a long time.

The surface of the developing sleeve 71 may be smooth or, in order to retain the developer thereon assuredly and easily, the surface can have a roulette, for example, a roulette with a parallel pattern.

Furthermore, the magnetism-shielding member 75 or a combination of the magnetism-shielding member 75 with a member 78 composed of non-magnetic substance (for example, aluminum) may be disposed as the magnet-supporting member on the side wall of the developer vessel so that the angle of the magnet mechanism can be adjusted. In addition, the magnetic carrier-peeling position P*f* can be made closer to the developing position P*d*, if, as illustrated in FIG. 4, the magnetism-shielding member 75 is disposed to cover the opposite side pole S of the magnetic brush-forming magnet 73 and the side portion of the pole S positioned on the side where the developer-pumping magnet 74 is provided, and if at the same time as illustrated in FIG. 5, the magnetism-shielding member 75 is disposed to cover the side portion of the pole S positioned on the side opposite to the side where the developer-pumping magnet 74 is provided.

Figure 5:
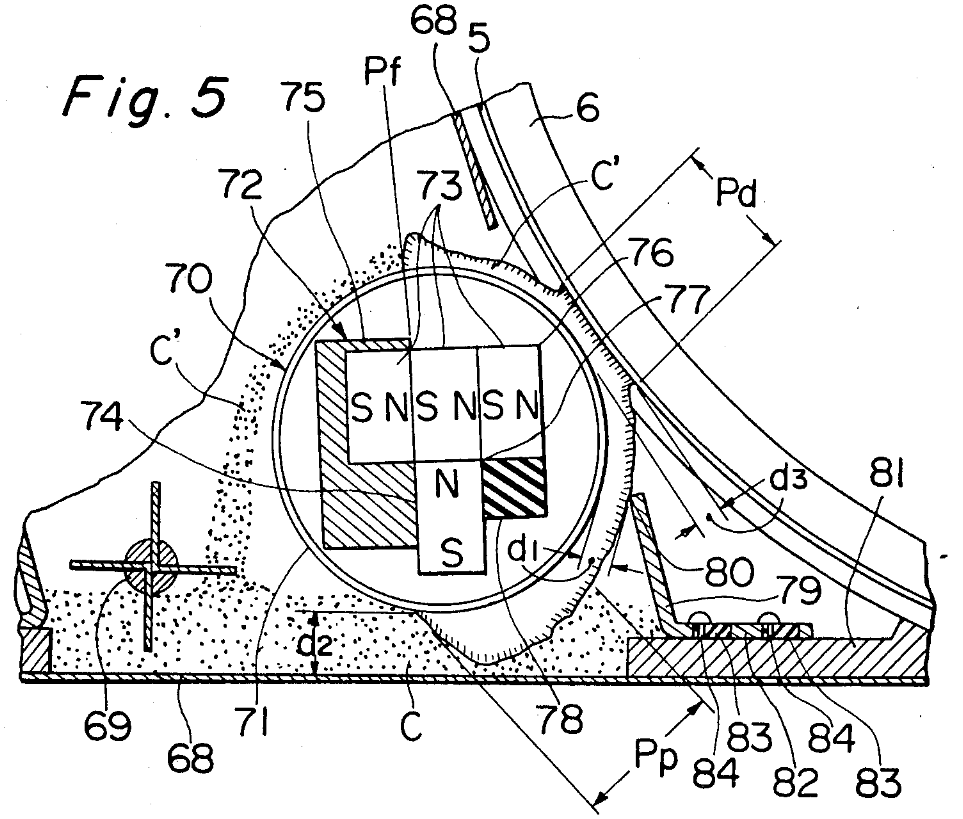

In the developing apparatus shown in FIGS. 3 to 5, a brush length-adjusting mechanism 79 is disposed in the vicinity of the magnetic brush-supporting surface of the magnetic brush mechanism 70, i.e., the surface of the developing sleeve 71, between the developer-pumping position $P_p$ of the magnetic brush mechanism and the developing position P*d* where the magnetic brush is brought into contact with the electro-staic image-carring surface 5. This brush length-adjusting mechanism 79 comprises a sharp edged blade 80 and a slide member 82 mounted movably along the bottom face of the developer vessel 68 on a supporting seat 81 provided on the bottom face of the vessel 68.

This slide member 82 includes slot 83 extending in a direction normal to the axis of the magnetic brush mechanism 70, fitted to the supporting seat 81 through said slots 83, allowing the brush length-adjusting mechanism 79 to be adjusted. In addition to these adjustment members, any other known mechanisms can be optionally used to adjust the position of the blade edge 80 of the brush length-adjusting mechanism.

The adjustment of the position of this brush length-adjusting mechanism 79 is performed in the following manner by the above-mentioned adjustment mechanism.

a. The distance $d_1$ between the blade edge 80 of the brush length-adjusting mechanism 79 and the magnetic brush-supporting surface (the surface of the sleeve 71) is made shorter than the distance $d_2$ between the magnetic brush-supporting surface and the bottom face of the developer vessel at the developer-pumping position $P_p$.

b. The distance $d_3$ between the electro-static image-carrying surface 5 and the magnetic brush-supporting surface at the developing position $P_d$ is made a little shorter than the distance $d_1$ between the blade edge 80 of the brush length-adusting mechanism and the magnetic brush-supporting surface.

The distance $d_3$ between the electro-static image-carrying surface 5 and the magnetic brush-supporting surface is varied considerably depending on the kind of the electro-static image-carrying surface. For instance, a good image is obtained when in the case of a zinc oxide photosensitive layer the distance $d_3$ is about 4 mm and in the case of a cadmium sulfide photosensitive layer the distance $d_3$ is about 2 mm. The distance $d_3$ can be easily adjusted as desired, for example, by mounting the entire developing device or the magnetic brush member movably with respect to the sensitive drum. The distance $d_2$ between the magnetic brush-supporting surface and the bottom face of the developer vessel is made longer than the distance $d_3$ so that at the developer-pumping position $P_p$ the pumping of the developer can be readily accomplished and a fresh developer can be sufficiently supplied at said pumping position $P_p$. The distance $d_1$ between the blade edge 80 of the brush length-adjusting mechanism and the magnetic brush-supporting surface is made a little longer than said distance $d_3$. More specifically, the distance $d_1$ is so set that the value of $(d_1 - d_3)$ is generally 0 to 2 mm, especially about 0.5 mm.

When the distance $d_1$ between the tip point 80 of the brush-length-adjusting mechanism and the magnetic brush-supporting surface is adjusted in the foregoing manner, the developer *c* pumped at the developer-pumping position $P_p$ and transported therefrom is bought into a slidable contact with the blade edge 80 of the brush length-adjusting mechanism and the excessive portion of the developer is removed. Accordingly, a magnetic toner provides magnetic brush of uniform density and a uniform length at the developing zone P*d*. An appropriate amount of a developing toner is always stably and uniformly transported to the developing zone P*d*. The amount of the developing toner transported is not so excessive as will cause excessive application of the toner on the electro-static image-supporting face and is not so scarce as will cause insufficient application of the toner on the electro-static image-supporting surface. Furthermore, by adjusting the above distance $d_1$ within a specific range in relation to the clearance $d_3$ at the developing zone P*d*, a light, sure and uniform contact can be attained between the magnetic brush and the electro-static image-carrying face at the developing position Pd, whereby the electro-static image can be developed faithfully.

Figure 6:
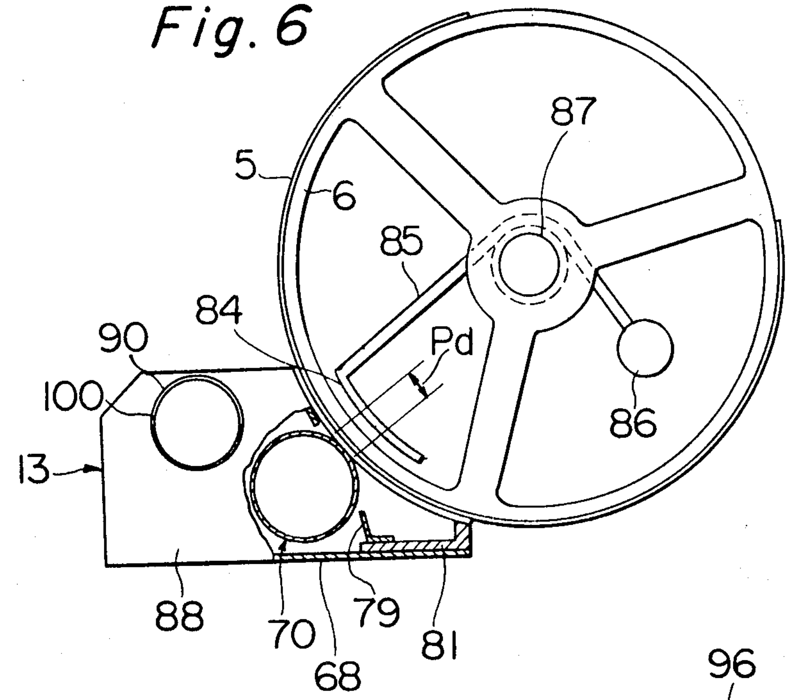
FIG. 6 is a side view illustrating the arrangement of the developing counter pole used in combination with the developing apparatus of FIG. 3.

In the magnetic brush mechanism 70, it is preferred that a substantially parallel magnetic brush is formed at the above-mentioned developing zone Pd. In this case, the toner powder can be tightly and uniformly contacted with the electro-static image-carrying surface 5 according to the magnetic brush. In order to attain this feature, as is illustrated in FIG. 6, a developing counter pole 84 may be disposed in the substantially stationary state in the vicinity of the inner face of the portion of the photosensitive drum 6 confronting the magnetic brush mechanism 70.

In order to dispose the developing counter pole 84 in the substantially stationary state in the vicinity of the inner face of the photosensitive drum 6, the developing counter pole 84 is attached to one end of an arm 85, both ends of which are directed downwardly, and a balancing weight 86 is attached to the other end of this arm 85. The central portion of the arm 85 is engaged with or fitted to the rotary shaft 87 of the photosensitive drum 6, so that the arm is freely hanging down from the shaft 87. Thus, even when the photosensitive drum 6 supported on the ends of the shaft is rotated, the weight 86 the developing counter pole 84 can be always located to align the magnetic mechanism 70 with the developing position P*d*. When the photosensitive drum is supported in the open side manner on one frame of the machine housing, the developing counter pole 84 is fixed to the other frame of the machine housing. This enables the developing counter pole 84 to always confront the magnetic brush mechanism at the developing position. When the developing counter pole 84 is disposed in the vicinity of the inner face of the photosensitive drum in the foregoing manner to confront the magnetic brush mechanism at the developing position, the earing of the magnetic brush can be always kept parallel in the vertical direction and maintained in good conditions, and at the same time, the effective area can be enlarged at the developing zone P*d*. Alternatively, the substrate of the photosensitive drum may be composed of a magnetic substance, but since the magnetic flux extends in a broad region, the magnetic carrier is adsorbed on the surface of the photosensitive drum 6 and it is transported to the transfer zone and other treatment zones in the state adsorbed on the drum surface, which results frequently in bad influences on the image. It is also possible to wind a thin magnetic substance on the inner face of the photosensitive drum, but when this is done, the magnetic resistance is too great and the intended effects cannot be obtained. In the foregoing embodiment of this invention, by disposing the developing counter pole 84 to meet the abovementioned positional requirements, it is possible to reduce the magnetic resistance and to attain the desired effects.

The supply of the developing toner will now be described by referring to FIG. 3 again.

In the upper portion of the developer vessel 68 forming one chamber, an inlet 90 (see FIG. 6) is provided to insert a cylindrical cartridge 89 for supply of a toner into the side wall 88 of the developer vessel, and a supporting member 91 is provided on a toner supply chamber 93 to support rotatably the cartridge 89 inserted from the inlet 90. This toner supply chamber 93 is separated through partition walls 94 and an opening 92 is provided on the lower partition wall.

Figure 7:
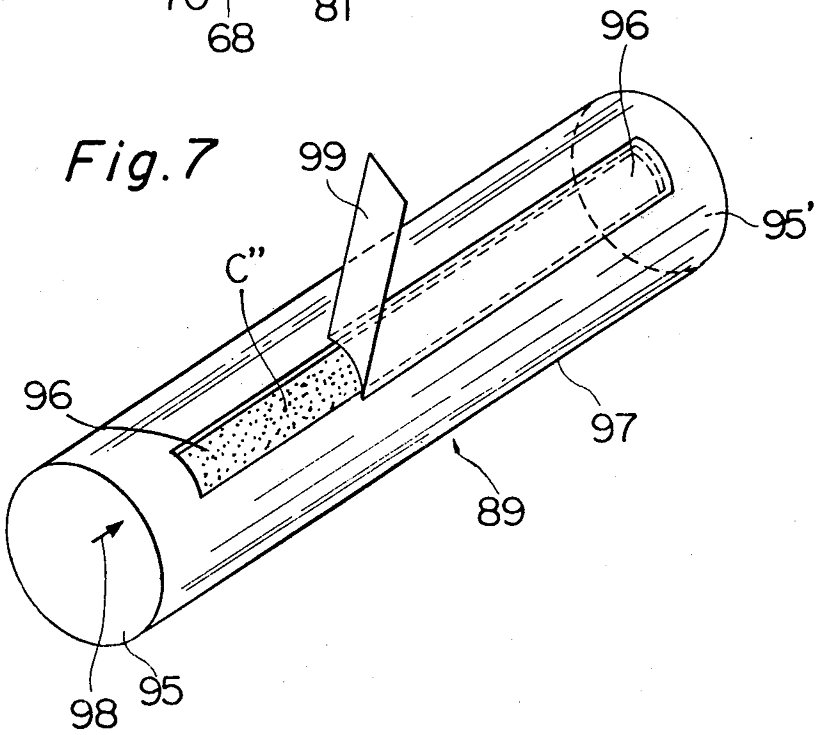
FIG. 7 is a perspective view illustrating a toner supply cartridge used in the developing apparatus of FIG. 3.

The toner supply cartridge 89 comprises, for instance, as illustrated in FIG. 7, a cylinder 97, both ends 95,95' of which are closed and which is provided with an opening 96 sealable and openable along the substantially entire length of the cylinder. A toner powder *c''* is contained in the cylinder. The opening 96 of the cylinder 97 includes outlets of such configuration and dimension that when the sealing of the opening is released and the opening faces downwardly, the toner powder *c''* contained in the cylinder is discharged uniformly along substantially the entire length of the cylinder. At such outlet, there may be positioned, for instance, slit-like openings formed along the entire length of the cylinder and a number of holes distributed along the entire length of the cylinder. At least part of at least one of the side walls 95,95' of the cylinder is made of a transparent or semi-transparent material so that the toner contained in the cylinder can be observed from the outside. On this portion 95 or 95' of the cylinder a mark 98 is provided indicating the position of the opening 96. The mark may be an arrow, letter, figure, projection or convexity. The opening 96 of the cartridge 89 may be sealed by an adhesive tape 99 or the like, or outside edges of the opening 96 may be integrally formed with the cylinder through a cuttable perforated line or the like.

In supplying a toner into the toner supply chamber 93, the opening 96 of the cartridge 89 initially faces upwardly, and in this orientation the opening 96 is unsealed. Then, while maintaining the cartridge in this state, it is inserted into the interior of the toner supply chamber 93 through the inlet 90 provided on the side wall 88 of the developer vessel. The cartridge 89 is then rotated 180°, whereby the opening 96 of the cartridge faces downwardly and a necessary amount of the toner is supplied into the toner supply chamber 93.

When the toner supply cartridge 89 as shown in FIG. 7 is employed, the supply of the toner into the developing apparatus 13 can be accomplished very easily without contaminating hands of a machine operator or scattering fine toner powder. Further, provision of the mark 98 indicating the position of the opening 96 on the side edge portion 95 or 95' of the cylinder makes it possible to conduct unsealing of the opening 96 easily without mistake, and insertion of the cartridge into the toner supply chamber 93 and supply of the toner by turning the cartridge to the prescribed position can be performed very easily with certainty. Moreover, it is easy to confirm whether the cartridge is located correctly at the toner supply position. Moreover, since the side edge portion 95 or 95' of the toner supply cartridge 89 is composed of a transparent or semi-transparent material, the amount of the toner contained in the cartridge can be easily confirmed from the outside and hence, the supply of the toner can be accomplished promptly without delay. In order to facilitate insertion and turning of the cartridge 89, it is generally preferred that the cylinder of the toner supply cartridge and the inlet 90 have a circular form, but when the inlet 90 is constructed of an individual member rotatable on the side wall of the developer vessel, they may take any other optional form.

In order to prevent the toner from scattering into the outside and ensure the support of the cartridge while preventing shaking of the cartridge, it is preferred that a packing member 100 of planted hairs or sponge be provided along the periphery of the inlet 90.

In the embodiment shown in FIG. 3, at the position of the opening 92 provided in the lower portion of the toner supply chamber 93, there is rotatably mounted a toner supply roller 102 having grooves 101 on the surface thereof. On the lower end portion of the partition wall 94, ends of elastic members 103 are fixed. The elastic members 103 are composed of a flexible material such as a Mylar film. The free ends of the 103 are allowed to make contact with the peripheral surface of the toner supply roller 102.

When the toner supply roller 102 is stopped, the toner supply chamber 93 and a developing chamber 104 are in an enclosed state. When the toner supply roller 102 is rotated in the clockwise direction, the toner contained in spaces of the grooves 101 is fed into the developing room 104. The afore-mentioned agitation mechanism 69 is disposed below the toner supply roller 102, and it frictionally charges the freshly supplied toner while mixing it with the magnetic carrier. The resulting developer composition is then fed to the developer-pumping position of the magnetic brush mechanism 70 by means of the agitation mechanism 69.

In the foregoing manner, in the toner supply mechanism illustrated in FIG. 3, an appropriate amount of a toner powder is freshly supplied by rotating manually or automatically the toner supply roller 102 after obtaining a prescribed number of copies. Unadvantage to this toner-supplying operation is that it can be accomplished without taking out the development mechanism 13 from the machine housing.

TRANSFER MECHANISM

As is illustrated in FIG. 8A, the transfer mechanism 36 used in this embodiment comprises a transfer roller 107 including a roller base 105 composed of an electrically conductive rubber or other electric conductive material such as a metal and an insulating thin layer 106 which is coated on the roller base 105, and an electric source 109. The transfer roller 107 is disposed to press transfer paper b against the surface layer 5 of the photosensitive drum 6, and the electric source 109 is provided to apply a voltage between the electrically conductive base 108 of the photosensitive drum 6 and the electrically conductive base 105 of the transfer roller 107.

In the conventional transfer system utilizing cold electric field discharge by an electrically conductive roller, the transfer voltage is applied directly on the photosensitive layer, and when transfer paper is present between the photosensitive layer and the electrically conductive roller, since the electric voltage is applied through the resistance of the transfer paper, a direct short-circuit is not formed. However, since the size of the transfer paper is usually smaller than the size of photosensitive layer, a direct short-circuit is formed frequently between the photosensitive layer and the electrically conductive roller, with the result that discharge destruction occurs in the photosensitive layer. This results in difficulties such as degradation of the photosensitive layer and formation pin holes. Furthermore, the transfer operation is frequently made impossible by short-circuits from discharge destruction points. In the foregoing embodiment of this invention, the insulating thin layer 106 a relatively low resistance such as 20 to 100 M Ω and is composed of paper, rubber, fiber, plastic or the like is formed on the surface of the roller base 105. Therefore, there can be attained an effect similar to the effect attained when transfer paper is continuously positioned between the photosensitive layer 5 and the electrically conductive roller. Troubles with the photosensitive layer caused by discharge destruction or formation of pin holes can thereby be effectively elimated. Furthermore, even if pin holes are formed on the photosensitive layer, the untransferable region formed by the short-circuit discharge from the pin holes is limited to the pin hole portion, and such undesired phenomenon as complete failure of transferring does not occur the transfer mechanism of this embodiment, accurate adjustment of the transfer voltage need not be effected, and a stable transferred image can be obtained easily.

The above-illustrated developing mechanism and transfer mechanism can be broadly applied to optional electrostatic photographic copying machines and electrostatic printing machines of the type where the development is conducted using a toner powder.

DEVICE FOR ELIMINATION OF JAMMING IN THE VICINITY OF THE FIXATION ZONE

In a copying machine provided with a fixation mechanism for fixing the toner powder image, when paper jamming occurs in this fixation zone and the copying operation is continued in this paper-jammed state, the transfer sheet or copy paper is excessively heated in the fixation zone, resulting in paper burning. In the copying machine illustrated in FIG. 1, pulleys 43,44,44' supporting the endless belt 45 defining the downstream side of the transfer paper-transporting passage are attached to a frame member 57 and this frame member 57 is pivotted to the shaft 58 of the pulley 43 located at a position most upstream of the endless belt 45 as a fulcrum. In such structure, the endless belt 45 can be opened or exposed and closed while it oscillates, together with the frame member 57, from the point 45A indicated by solid lines in FIG. 1 to the point 45B indicated by double-dotted lines. As shown in FIG. 8-B, a latch 59 is mounted on the frame member 57 to maintain the endless belt 45 at the regular position 45A under ordinary operating conditions, while the latch is engage with an engaging member 60 mounted on the frame of the machine housing 1. Upstream of the endless belt 45 there is provided a first transfer paper-detecting member D*t* 1. A second transfer paper-detecting member D*t* 2 is provided near the downstream end of the endless belt 45. By these detecting members, paper jamming in the fixing zone can be detected. When transfer paper is detected by the first detecting member D*t* 1 (switch S5) and after a prescribed period of time required for the transfer paper to travel from the first detecting member to the second detecting member, transfer paper is not detected by the second detecting member D*t* 2 an alarm signal is given to an operator so as to inform the operator that paper is jammed in the fixing zone. Opening or exposure of the endless belt 45 may be accomplished manually, but it is preferred that the endless belt 45 be opened automatically. For attainment of automatic opening of the endless belt 45, the latch 59 and engaging member 60 are so mounted that when occurrence of paper jamming in the fixing zone is detected by detecting members D*t* 1 and D*t* 2, the latch 59 or engaging member 60 is actuated by an electromagnetic mechanism L3 such as a solenoid to release the engagement between the latch 59 and engaging member 60, whereby the endless belt 45 is automatically shifted to the opened position 45B. In the embodiment shown in FIG. 1, since the frame member 57 is mounted pivotably on the shaft 58 of the driving pulley 43, which serves as a fulcrum, the endless belt 45 can be driven and rotated while in the opened position 45B. When the jammed paper is expelled from the fixing zone by opening the endless belt 45, the jammed transfer paper is automatically discharged from the interior of the machine.

DRIVE SYSTEM

The operation of each mechanism of the copying machine of this invention is accomplished by the driving system illustrated in FIGS. 11-A, 11-B and 11-C.

In FIG. 11-A various belts and pairs of transporting rollers are provided in the transfer paper-transporting passage 23. In addition, a pair of roll-like transfer paper feed rollers and a pair of sheet-like transfer paper feed rollers are continuously driving through a chain 117 by means of a driving motor DM. A pair of roll-like paper feed rollers 30,30' or a pair of sheet-like paper feed rollers 53, 53' are driven through the chain 117 when either the roll-like paper feed clutch C2 or sheet-like paper feed clutch C3 is actuated, respectively. The photosensitive drum 6 and transfer roller 36 are driven through the driving chain 117 only when the drum-moving clutch C1 is actuated.

The reciprocating movement of the moving frame 3 is accomplished by a moving frame-driving mechanism comprising a clutch C4 for the moving exposure process (movement in the right direction) and a clutch C5 for the return course (movement in the left direction). For such a driving mechanism, there may be employed, for instance, a combination of a driving drum driven and rotated in one direction or the reverse direction of clutches C4 and C5 and a wire, and a plurality of driving rotors driven and rotated in one or reverse direction by change-over of clutches C4 and C5.

A embodiment for a driving mechanism of the moving frame is shown in FIGS. 11-A and 11-B.

More specifically, the wire 119 is wound on the driving drum 118 and one end of the wire 119 is fixed to a wire-fixing point 121 on the moving frame 3 through a reel 120 pivoted on one end of the machine housing 1, while the other end of the wire 119 is fixed to the wire-fixing point 121 of the moving frame 3 through a reel 120' pivoted on the other end of the machine housing 1. As is illustrated in FIG. 11-B, electromagnetic clutches C4 and C5 including sprockets 122 and 122', respectively, which are continuously driven by the driving chain 117, are attached to the machine housing 1. The rotary disc C4' of the electromagnetic clutch C4, the driving drum 118 and a sprocket 123 are mounted on the same shaft 124, and the rotary disc C5' of the electromagnetic clutch C5 and a sprocket 125 are mounted on the same shaft 124'. A chain 126 is hung on the sprockets 123 and 125 so that both the shafts 124 and 124' are rotated in the same direction. The sprockets 122 and 122' are rotated at the same speed but in opposite directions. When by the operation of the change-over mechanism the magnetic clutch mechanism C4 is energized, the rotary disc C4' is connected with a clutch plate **122*a'* of the sprocket 122 by a magnetic force and hence, the driving drum 118 is rotated in the same direction as the sprocket 122 and the moving frame 3 is moved on the exposure process by the wire 119. At this time, the shaft 124' is also rotated through sprockets 123 and 125 and the chain 126, but since the electromagnetic clutch mechanism C5 is not energized, the sprocket 122' is with respect to the shaft 124'. Then, by the return of the change-over mechanism, the electromagnetic clutch mechanism C5 is energized while the electromagnetic clutch mechanism C4 is not energized. In this case, the sprocket 122' and shaft 124' are connected to each other by a magnetic force, and the driving drum 118 is rotated in the direction opposite to the rotation direction in the above-mentioned case through the shaft 124, sprocket 123, chain 128, sprocket 125 and shaft 124', whereby the moving frame 3 is moved on the return course by the wire 119. In this case the sprocket 122 is kept in a state idle to the shaft 124**.

The direction of the reciprocating movement of the moving frame 3 is switched in the above-mentioned manner.

A restraint mechanism such as illustrated in FIG. 11-C is provided to restrain the moving frame 3 at the standard stop position without over-running when it has completed the travel of the return course and to prevent the once restrained moving frame from moving freely even when the electric source of the copying machine is turned off. This restraint mechanism comprises a projecting lever 128, which projects through the lower edge 127 of the moving frame 3 and a locking piece 130 having a notch 129 engageable with the projecting lever 128. The locking piece 130 is mounted oscillatably on a fulcrum 131 on the side wall of the machine housing 1 and biased toward the projecting lever 128 with a spring 132.

A switch $S_7$ for stopping the motion of the moving lever 3 by releasing both the clutches $C_4$ and $C_5$ is provided in combination with the restraining mechanism. This switch $S_7$ is located so that it is urged by the forward end 136 of the projecting lever 128 when the projecting lever 128 is in engagement with the notch 129 of the locking piece 130. One end 133 of the locking piece 130 is connected to the start solenoid $L_2$ through a linx 134. As will be described in detail below, when the copying start switch PB (see FIG. 12) is pushed, the start solenoid $L_2$ is energized to release the engagement between the projecting lever 128 and the notch 129. Then, before the moving frame 3 is returned, the supply of electricity to the start solenoid $L_2$ is stopped. As a result, the moving frame 3 that has returned is effectively locked by the locking piece 130, and simultaneously, its movement is stopped by the switch $S_7$.

Furthermore, an arrangement is made so that the start of movement of the moving frame 3 in the exposure process (movement in the reverse direction) is retarded from the initiation of actuation of the start solenoide $L_2$ by the time necessary for releasing locking between the projecting lever 128 of the moving frame 3 and the notch 129 of the locking piece 130.

CONTROL OF THE MOVEMENT OF THE MOVING FRAME

The movement of the moving frame 3 is controlled in relation to the rotation of the photo-sensitive drum 6 so that an image of the original above it is projected in a predetermined image-forming area of the photo-sensitive drum 6. The arrival of the forwarding end point of the area of the photosensitive drum on which to form an image at the upstream end of the opening for imagewise exposure disposed alongside the sensitive drum is detected by a suitable switching means, and then, the movement of the moving frame 3 for imagewise exposure is started, thereby to achieve synchronous exposure. There are three possible embodiments in the movement of the moving frame 3, namely (a) a reciprocating movement consisting of a forward movement cycle and a returning cycle for image exposure synchronous with the rotation of the sensitive drum, (b) a reciprocating movement consisting of a cycle of forward movement to a predetermined position and a returning cycle for image exposure synchronous with the rotation of the photo-sensitive drum, and (c) a reciprocating movement consisting of a cycle of movement in one direction by a distance about half of the exposure cycle, a cycle or movement in an opposite direction for image exposure synchronous with the rotation of the photo-sensitive drum and a cycle of movement in the first direction for returning to the original position. The above control method can be applied to any of these movements. In FIG. 10, a control mechanism for the moving lever 3 in accordance with the embodiment (a) is shown. Furthermore, in the embodiment shown in FIG. 10, control is so exercised that the photo-sensitive drum rotates once for each cycle of copying operation. Referring to FIG. 10, the forward end of the image forming area on the photosensitive drum 6, that is the forward end of the photosensitive material 3 or its vicinity, is defined as the forward end point *f*. The starting and stopping angular position $P_9$, at which the forward end point is to be situated before and after the copying cycle, is set at any desired point upstream (in the clockwise direction in FIG. 10) of the imageforming zone 7', preferably immediately upstream of the charging (electrification) device. A switch mechanism $S_1$ is provided so as to detect the end of the copying cycle (namely, the arrival of the forward end point f at the starting and stopping angular position $P_9$). Switch $S_1$ may be one of any desired type consisting of a fixed member and a moving member which moves with the rotation of the sensitive drum 6. For example, the switch $S_1$ may be composed of a limit switch provided at the angular position $P_9$ and a projection provided at an angular position at the forward end point f on the photosensitive drum.

Furthermore, a position $P_{10}$ for instructing initiation of the moving exposure is set on the introduction end of the image-exposing zone 11 or a little upstream thereof, and a switch $S_2$ for initiation of movement of the moving frame 3 is disposed so that when the forward end point *f* of the photosensitive drum arrives at this position $P_{10}$ for instructing the initiation of the moving exposure, the switch $S_2$ detects this arrival and actuates the moving frame 3 to initiate the exposure process.

The moving exposure process of the moving frame 3 is initiated by actuating the clutch $C_4$. Furthermore, a switch $S_8$ for defining one end of the movement of the moving frame in the exposure process is located along the path of travel of the moving frame 3 so that when the moving frame 3 arrives at a point $P_{11}$, the switch $S_8$ detects this arrival, stops the supply of energy to the clutch $C_4$ and energizes the clutch $C_5$ for the return process. Similarly, a switch $S_7$ for defining the original position $P_{12}$ of the moving frame is provided along the moving passage of the moving frame so that when the moving frame 3 completes the return process and arrives at the position $P_{12}$, the switch $S_7$ detects this arrival and resets the clutch $C_5$ for the return process. Furthermore, it is preferred to mount the locking mechanism 205 as shown in FIG. 11-C below the moving frame 3.

Each of the above-described switches may be either a mechanical switch which is adapted to be pressed or engaged with a projection formed on the photosensitive drum or moving frame, or a switch of the photoconductor system.

CONTROLLING OF SUPPLY AND CUTTING OF TRANSFER PAPER

The supply of a transfer paper is controlled so that the leading edge of the transfer paper corresponds with that of the image-forming area on the sensitive drum.

Referring to FIGS. 9 and 10, the position of cutting a roll of transfer paper b' is shown at $P_1$, and the position of contact between the photosensitive drum 6 and the transfer paper, at $P_3$. Position $P_4$ for instructing the start of paper supply is set at a separated position along the circumference of the photo-sensitive drum in a direction opposite to its rotating direction by the same distance from the contact position $P_3$ from the distance ($l_2$) between the contact position $P_3$ and the cutting position $P_1$. In other words, the position $P_4$ for instructing the supply of paper is determined so that the distance $l_1$ along the circumference of the drum between the paper supply instructing position $P_4$ and the contact position $P_3$ is equal to the distance $l_2$ along the transfer passage for transfer paper between the cutting position $P_1$ and the contact position $P_3$.

A first switch mechanism $S_3$ is provided so as to detect the arrival of the forward end of the image-forming area (namely, the forward end point f) at the paper supply initiating instructing position $P_4$ and actuate the clutch $C_2$ for the paper feed roller 30. The switch mechanism $S_3$ consists of member fixed to the side portion of the photo-sensitive drum or a position along its circumference and a member rotating together with the photo-sensitive drum.

In this invention, the peripheral speed $v_1$ of the photosensitive drum 6 is always made euqal to the travelling speed $v_2$ of transfer paper *b* ($v_1 = v_2$), and the circumferential distance $P_1$ from the transferring contact position $P_3$ to the position $P_4$ for instructing initiation of feeding of transfer paper is made equal to the distance $l_2$ of the transfer paper-transporting passage from the transferring contact position $P_3$ to the position $P_1$ for initiation of feeding of transfer paper. Accordingly, when the forward end point *f* on the photosensitive drum 6 reaches the position $P_4$, feeding of a roll-like transfer paper is initiated by actuating the paper feed clutch $C_2$, whereby in the transfer zone 8 the forwarded end position of the photsensitive drum 6 is always engaged synchronously with the leading edge of the transfer paper.

Furthermore, in the present invention, the drum 6 is set so that the circumferential distance $l'_A$ between the position $P_5$ and the position $P_4$ of instructing the start of paper supply is equal to the length $l_A$ of the original *a* to be copied. A second switch mechanism $S_6$ is provided so as to detect the arrival of the forwarding end point *f* of the photosensitive drum at the cutting position $P_5$. The switch mechanism $S_6$ actuates transfer cutting mechanism 32 when the forwarding end point *f* has arrived at the cutting position $P_5$. This leads to cutting of the transfer paper, and the release of the clutch $C_2$ thereby stopping rotation of the paper feed rollers 30,30'. As a result, the leading edge of the cut transfer paper *b'* is stopped at the cutting position $P_1$ and maintained there.

The switch mechanism $S_6$ may be made of a member fixed to the machine frame and a member fixed to the side portion of the sensitive drum 6 or in its vicinity so as to define the copying length. It is also possible to provide a plurality of members for defining the cutting positions so that some predetermined copying lengths can be selected stepwise. However, it is preferred to provide a switch mechanism capable of adjusting the cutting position $P_1$ so that random cutting is possible.

A cutting position adjusting mechanism for performing random cutting is shown in FIG. 9. Switch $S_6$ for defining the cutting instructing position $P_5$ is positioned on a support plate 111 provided rotatably and coaxially with the shaft 87 of the sensitive drum 6. The support plate 111 has a length almost equal to the radius of the drum 6, and in its vicinity, is connected to a wire 116 disposed in a loop through guide pulleys 115 and 115'. Furthermore, a setting member 113 having an indicator dial is provided on a guide member 114 so that it can move along the moving frame 3. The setting member is further connected to the wire 116 so that the cutting instructing position $P_5$ corresponds with the position $P_4$ for instructing the start of paper supply while its indicator dial corresponds with the forward end $P_6$ of transparent plate 2 on which the original is placed. Accordingly, the support plate 111 moves according to the movement of the cut length setting member 113, and the distance $l_A$ between the forward end position $P_6$ of the transparent plate and the indicator dial 112 becomes equal to the circumferential distance $l'_A$ between the position $P_4$ and the position $P_5$. Thus, by adjusting the position of the setting member with respect to the original *a* to be copied, the length of the transfer paper can be made to correspond with a desired length of the original *a*.

Thus, in the copying apparatus of this invention, the position $P_4$ of instructing the start of paper supply is predetermined in relation to the position $P_1$ at which a roll of transfer paper is cut. Furthermore, the forward end of the transfer paper is stopped at $P_1$ and remains there so that the position $P_5$ is predetermined with regard to the desired copying length. Furthermore, the first switch mechanism $S_4$ for defining the position $P_4$ and the second switch mechanism $S_6$ for defining the position $P_5$ are provided. By such a relatively simple construction, the control of the feeding and cutting of a roll of transfer paper is effected with a minimum of detecting and controlling motion, and jamming of paper can be markedly reduced. In other words, all the control of the feeding and cutting of transfer paper can be made by two actions, one for instructing and feeding of a roll of transfer paper by the first switch mechanism $S_4$ and the other for instructing the cutting of the transfer paper and the stopping of the paper feed by the second switch mechanism $S_6$.

A mechanism for controlling the supply of the sheet-like transfer paper $b''$ is shown in FIGS. 9 and 10. Near the inserting end for the sheet-like transfer paper, synchronising rollers 53 and 53' equipped with clutch $C_3$ are provided. A switch $S_9$ for defining the stopping position $P_7$ of the transfer paper is provided at the nip position of the synchronizing rollers 53 and 53' or immediately downstream thereof. The switch $S_9$ is actuated by the forward end of the sheet-like transfer paper $b''$ and temporarily stops the rollers 53 and 53' on releasing the clutch $C_3$. Furthermore, the position of $P_8$ for instructing the start of delivering the sheet-like transfer paper is determined along the photo-sensitive drum 6 so that the distance $l'_1$ along the circumference of the photo-sensitive drum 6 between the position $P_8$ and the contact position $P_3$ becomes equal to the distance $l'_2$ between the stopping position $P_7$ for the sheet-like transfer paper and the contact position $P_3$. A switch mechanism $S_3$ for defining the position $P_8$ for instructing the start of supplying the sheet-like transfer paper is provided about or adjacent to the surface of the photo-sensitive drum. The switch mechanism $S_3$ causes the engagement of the clutch $C_3$ and therefore, the resumption of rotation of the rollers 53 and 53' when the forward end point *f* on the photo-sensitive drum 6 has reached the position P for instructing the start of delivery of the transfer paper. Consequently, the forward end point *f* on the photo-sensitive drum 6 and the leading edge of the sheet-like transfer paper reaches the transfer zone 8.

OTHER CONTROL MECHANISMS

As is shown in FIGS. 8-B and 10, a switch $S_5$ is provided in proximity to the photo-sensitive drum 6 and the contact position $P_3$ so as to control the time of application of transfer voltage. The operation of the switch $S_5$ will be described hereinbelow.

The fixing mechanism 46 includes a thermostat TH for maintaining the heating element 47 and the fixing mechanism at a predetermined temperature.

OPERATION

The operations of the above-described mechanism of the electrostatic photographic copying machine of this invention are accomplished in the following manner by an electric circuit shown in FIGS. 12-A and 12-B and a control system illustrated in FIG. 10.

I. In the Case of Automatic Feeding of a Roll of Transfer Paper:

1. When the main switch $S_{10}$ is closed, the drive motor DM, the heater 47 of the fixation mechanism 46 and the light source 12 for the entire exposure are energized.

2. When the temperature of the heater 47 of the fixation mechanism 46 is elevated to a predetermined level, the normally open contact TH1 of the thermostat TH is closed to light a feed lamp FL, to inform an operator that the machine is in the operable state.

3. The length $l_A$ necessary for copying the original a is set by moving the transfer paper cutting length-determining mechanism 113, whereby the second switch mechanism, namely the switch $S_6$ for instructing cutting of transfer paper, is set at the desired position.

4. The switch PB for initiation of copying is pushed and the normally open contact of the switch PB is closed, whereby relay R2A and relay R2B are actuated through the normally open contacts of the switch PB and the switch $S_8$, and the normally open contact R2B-2 of the relay R2B is closed, with the result that the relay R2A and relay R2B are self-maintained to effect the following operations:

4-1. The normally open contact R2A-1 is closed and an image-exposing lamp 18 is lighted through a light-adjusting circuit in preparation for light exposure of the image portion.

4-2. The normally open contact R2A-2 is closed, and high voltage sources HV-1 and HV-2 for applying a corona discharge high voltage to electrification mechanisms 9, 10 and 11 are energized to prepare for electrification.

4-3. The normally open contact R2B-1 is closed to energize the start solenoid 12, whereby locking of the moving frame 3 is released in preparation for movement of the moving frame 3 for the light exposure process.

4-4. The normally open contact R2B-1 is closed to energize the relay R1, whereby the following operations are performed:

4-4-1. The normally open contact R1-3 is closed and the drum-driving clutch C1 is set, whereby the photosensitive drum 6 is rotated or driven. By driving the photosensitive drum 6, the normally closed contact **S1-*a* is kept closed (indicated by the solid line in the drawing) and the normally open contact S1-*b*** is kept open (indicated by the dotted line).

4-4-2. The normally open contact R1-3 is closed to actuate the relay R3.

The normally closed contact R3-1 is opened and the feed lamp FL is turned out. Further, the normally open contact R3-2 is closed, but the relay R5 is not actuated.

4-5. The normally open contact R2B-3 is closed, but this circuit is not actuated as yet.

4-6. The normally open contact R2B-4 is closed, but this circuit is not actuated as yet.

5. The switch S2 for initiation of movement of the moving frame 3 is actuated by rotation of the photosensitive drum 6.

5-1. The relay R4 is actuated through the normally open contact of the switch S2. Simultaneously, the normally open contact R4-1 is closed and self-maintenance of the relay R4 is attained.

5-2. By the operation of the relay R4, the normally open contact **R4-2*b* of the relay switch R4-2 is closed and the normally closed contact R4-2*a* of the relay switch R4-2** is opened.

5-3. The clutch C4 for moving the moving frame on the exposure process is actuated through the switch S2, the normally open contact R2B-3 and normally open contact **R4-2*b*, whereby the moving frame 3 begins to move initiate the exposure process. This motion is to the right in FIG. 10.**

5-4. By rotation of the photosensitive drum 6, the switch S2 is is opened, but self-maintenance is attained in the relay R4. Further, with initiation of the movement of the moving frame 3, the switch S7 for detecting the standard point of the moving frame 3 is closed.

5. The photosensitive drum 6 is rotated to actuate the first switch mechanism, namely, the switch S4 for initiation of feeding of a roll of transfer paper.

6-1. The relay R6 is actuated through the contact R2B-4, switch S4 and normally closed contact S6a of the switch S6, and the self-maintenance of the relay R6 is attained by closing of the normally open contact R6-1.

6-2. The roll-like paper feed clutch C2 connected in parallel to the relay R6 is actuated through the normally open contact R2B-4, switch S4 and normally closed contact S6*a* of the switch 6, whereby a pair of the roll-like transfer feed rollers 30, 30′ are driven to initiate feeding of roll-like transfer paper).

6-3. The normally open contact R6-2 is closed, and the motor MDM for rotating the developing mechanism starts rotating to activate the developing mechanism).

6-4. By rotation of the photosensitive drum 6, the switch S4 is opened, but the self-maintenance of relay R6 is attained and paper feed clutch is operated.

7. The leading edge of the transfer paper *b* actuates the transfer switch S5. The normally open switch S5 is closed to actuate the on and off-delay relay R8, whereby the normally open contact R8-1 is closed a little later to energize a high voltage electric source 109 of the transfer mechanism 36 to initiate operation of the transfer mechanism 36.

8. The rotation of the photosensitive drum 6 is continued, and the second switch mechanism, namely the switch S6 for cutting the roll-like transfer paper, is actuated. Thus, the normally closed contact S6*a* of the switch S6 is opened and the normally open contact S6 is closed.

8-1. By closing of the normally open contact S6*b*, the relay R7 is actuated through the contact R6-1 and contact S6*b*, whereby the normally open contact R7-1 is closed to energize the cutter solenoid L1 and the transfer paper is cut. Since the relay R6 is an off-delay relay, the contact R6-1 and the relay contact R7-1 are opened a little later. Accordingly, the cutter solenoid L1 is operated in a pulse mode, and the cutting mechanism 32 is restored to its original state.

8-2. By opening the normally closed contact S6*a*, the roll-like paper feed clutch C2 is turned off to stop driving the feed rollers 30, 30′, and simultaneously, the leading edge of the remaining transfer paper is stopped and allowed to stand by at the point P1 for actuation of the cutting mechanism 32.

8-3. By stoppage of the operation of the relay R6, the normally open contact R6-2 is turned off and the motor MDM for driving the development mechanism 13 is disenergized (stoppage of operation of the development mechanism 13). By disposing the switch S4 for initiation of feeding of roll-like transfer paper (first switch) and the switch S3 for feeding of sheet-like transfer paper sheet, so that they are actuated when the forward end point f of the image-forming area of the photosensitive drum 6 arrives at the introduction end of the development mechanism 13 or a point close to the said introduction of the development mechanism, the development mechanism 13 can be operated appropriately depending on the length $l_A$ necessary for copying, 9. The moving frame 3 arrives at the position P11 of completion of the exposure process and presses the switch S8 for detecting the moving end of the moving frame 3, whereby the normally closed switch S8 is opened to stop the operation of the relays R2A and R2B. Since the relay R2A is an off-delay relay, closing or opening of the relay is a little delayed.

9-1. The normally closed switch S8 is opened and the normally opened contact R2B-2 is opened. Simultaneously, the self-maintenance of the relays R2A and R2B is released.

9-2. The normally open contact R2B-3 is opened to stop the operation of the relay R4 and the normally opened contact R4-2*b* of the relay switch R4-2 is opened to reset the clutch C4 for the exposure process thereby terminating movement of the moving frame 3 for the exposure process. The normally closed contact R4-2*a* of the relay switch R4-2 is closed and the clutch 65 for the return process is set through the normally closed switch S7 and the contact R4-2*a* for (initiation of movement of the moving frame 3 for the return process).

9-3. The normally open contact R2A-1 is opened a little later, and the light source 18 for the image light exposure is turned off for termination of light exposure of the image.

9-4. The normally open contact R2A-2 is opened a little later, and high voltage electric source HV-1 and HV-2 are de-energized, thereby completing electric fixation of the photosensitive layer.

9-5. The normally open contact R2B-1 is opened to stop the operation of the start solenoid L2. The locking piece 130 of the restraint mechanism is restored to keep the projecting lever 128 of the moving frame 3 and the notch 129 in the condition capable of being engaged with each other, thereby preparing for locking and stoppage of the moving frame 3.

9-6. The normally open contact R2B-1 is opened to stop the operation of the relay R1, whereby the normally open contact R1-3 is opened. However, the clutch C1 for the photosensitive drum continues the operation through the normally closed contact S1*b* of the switch S1.

9-7. The normally open contact R2B-4 is opened.

10. By passage of the rear edge of the transfer paper through the position of the transfer switch S5, the transfer switch S5 is opened, whereby the operation of the off-delay relay R8 is stopped and the normally open contact RS-1 is opened after a short delay. Thus, the high voltage electric source 109 for the transfer mechanism 36 is de-energized stopping operation of the transfer mechanism 36.

The image-transferred transfer paper is separated from the drum 6 and heated by the heating element 47 to effect the fixation of the image. Then, the transfer paper so treated is discharged from the machine as a copy sheet.

11. The moving frame 3 arrives at the standard stop position P12 to act on the switch S7 for detecting the standard position of the moving frame, whereby the normally closed switch S7 is opened and the clutch C5 for the return process movement is reset.

Simultaneously, the projecting lever 128 of the moving frame 3 is engaged with the notch 129 of the locking piece 130 to lock and stop the moving frame 3. Thus completion of the return process movement of the moving frame and stoppage and locking of the moving frame occurs.

12. One rotation of the photosensitive drum 6 is completed to actuate the switch S1 for detecting the standard position of the drum, so that the normally closed contact S1*a* of the switch S1 is opened and the normally opened contact S1*b* is closed.

12-1. By opening the normally closed contact S1*a*, the photosensitive drum-driving clutch is reset, and the photosensitive drum 6 is stopped at this position.

12-2. By opening of the normally closed contact S1*a*, the operation of the relay R3 is stopped, whereby the contact R3-1 is closed to light the feed lamp FL so that the operator can know that the next copying operation is now possible. At the same time, the normally open contact R3-2 is opened again.

II. Manual Feeding of Sheet-Like Transfer Paper

When manually feeding an individual sheet of transfer paper, the copying operation is carried out in the same manner as described above with respect to the case of the automatic feeding of roll-like transfer paper, except that the following procedures (3') and (6') are conducted instead of the above procedures (3) and (6), respectively. (3') The transfer sheet feed clutch C3 is actuated through the normally closed contact S9*a* of the insertion switch S9, whereby the transfer sheet feed rollers 53, 53' are usually driven.

When a transfer paper is manually inserted into the inlet, the leading edge of the transfer sheet is nipped between the feed roller 53 and 53' and the switch S9 is actuated.

By actuation of the insertion switch S9, the normally closed contact S9 of the switch S9*b* is opened, and the normally open contact S9*b* is closed.

By closing of the contact S9*a*, the operation of the sheet feed clutch C3 is reset and the rotation of the sheet feed rollers 53, 53' is stopped. Thus, stoppage and standing-by of the leading edge of the transfer paper is effected.

6'. The rotation of the photosensitive drum 6 is continued, and the switch S3 for initiation of feeding of the sheet-like transfer paper is actuated, whereby the normally open switch S4 is closed.

6'-1. The relay R5 is actuated through the normally open contact S9*b*, normally open switch S3 and normally open contact R3-2, and the normally open contact R5-2 is closed to attain self-maintenance in the relay R5.

6'-2. By closing of the normally open contact R5-1, the sheet feed clutch C3 is reset to drive the sheet feed rollers 53, 53' (initiation of feeding of transfer sheet).

6'-3. By opening of the normally closed contact R5-3, the roll-like transfer paper feed clutch C2 and the relay R7 for actuation of the cutter solenoid are de-energized and the circuit is used exclusively feeding of a sheet-like transfer paper.

6'-4. By passage of the rear edge of the sheet-like transfer paper through the position of the switch S9, the normally closed contact S9*a* of the switch 9 is closed again.

III. Repeated Automatic Copying Using Roll-Like Transfer Paper

When automatic copying is repeated using roll-like transfer paper, the copying operation is carried out in the same manner as described above with respect to automatic feeding of roll-like transfer paper, except the following procedures (4'') and (4''') are conducted before and after the procedure (4) and the following procedure (12'') is conducted instead of the above-mentioned procedure (12).

(4'') Print counter switches PC1 and PC2 are set to an optional number M ranging from 2 to infinity, whereby both the normally open contact PC1*b* of the switch PC1 and PC2*b* of the switch PC2 are closed.

4'''. Self-maintanance of the relay R1 is attained through the contact PC1*b* and the normally open contact R1-1. Accordingly, actuation of the start solenoid L2 is continued unless the contact PC1*b* is opened to effect continued unlocking of the moving frame. Similarly, the normally open contacts R1-2 and R1-3 are kept in the closed state unless the contact PC1*b* is opened.

Thus, the actuation of the photosensitive drum-driving clutch C1 is continued and the rotation of the photosensitive drum 6 is continued to effect continuous rotation of the photosensitive drum. (12'') On completion of one rotation of the photosensitive drum 6, the switch S1 for detecting the standard position of the drum is actuated, whereby the normally open contact S1*b* of the switch S1 is closed to actuate the relay R2A and relay R2B through S1*b*, R1-2 and S8, and the procedure (4) and subsequent procedures are repeated.

A counter coil PC is provided in parallel to the relay R7 for actuating the cutter solenoid L1, and a pulse for actuating the cutter solenoid L1 is given thereto, whereby the print counter switches PC1 and PC2 are restored to the zero point after repeating the copying operation a prescribed number of times. Thus, the contacts PC1*b* and PC2*b* are opened and the repeated copying is completed.

In the copying machine of this invention, when paper jamming occurs in the fixation zone, the detecting mechanism is operated in the following manner:

When transfer paper presses the switch D*t*1 (acting also as the switch S5) of the first detecting mechanism, the relay R8 is actuated and the normally open contact R8-2 is closed. The relay R9 is actuated through the normally open contact R8-2 and the normally closed switch D*t*2 of the second detecting mechanism. By closing the normally open contact R9-1 at this time, the relay R9 is self-maintained and by closing the normally open contact R9-2, the timer relay R10T is actuated. When the transfer paper does not press the switch D*t*2 after the passage of the predetermined time T2 for actuation of the timer, namely when the transfer paper is jammed between the switch D*t*1 and the switch D*t*2, the normally open contact R10T-1 is closed to actuate the solenoid L3 and to release engagement between the latch 59 and engaging member 60 (shown in FIG. 8-B). Simultaneously, by opening of the normally closed contact R10T-2, the heater 47 of the fixation mechanism 16 is de-energized. Thus, the jammed paper can easily be removed from the machine.

The above time T2 for actuation of the timer is adjusted so that the time T2 is a little longer than the time T1 required for transfer paper to travel from the first detecting switch D*t*1 to the second detecting switch D*t*2. In other words, T1LT2.

When no paper jamming occurs the normally closed switch D*t*2 is opened to turn off the relay R9 and since the normally open contact R9-2 is kept open, the timer relay R10T is not actuated.

What we claim is:

1. An electrostatic photographic copying apparatus comprising:

a frame member having a reciprocating transparent plate on which to place an original to be copied;

a rotatable photosensitive drum having an electrostatic photographic material on the periphery thereof;

a stationary optical system for projecting an image of the original placed on said transparent plate onto the surface of the photographic material as the transparent plate and photosensitive drum move relative to the optical system;

an image-forming zone disposed exteriorly of, and alongside, the periphery of said sensitive drum for forming on said sensitive material an electrostatic latent image corresponding to the image of the original or a developed image corresponding to the latent image;

a transfer zone for transferring said elctrostatic latent image or developed image to a transfer paper; and a transfer paper forwarding system for feeding the transfer paper to said transfer zone and for forwarding the transfer paper on which said electrostatic latent image or developed image has been transferred to a discharge end through a desired treating zone from said transfer zone;

wherein the improvement resides in the optical system which includes;

an optical opening for exposure to the original;

an optical opening for exposure of the surface of the sensitive material;

first and second reflex mirrors;

one mirror lens;

an optical chamber which is substantially optically closed except for said optical openings, and a light source for illuminating the original to be copied;

said two optical openings, first and second reflex mirrors and mirror lens being disposed so that the light reflected from the original to be copied follows a first path to said first reflex mirror through said optical opening for exposure of the original, is reflected by said first reflex mirror and follows a second path to said mirror lens, is reflected by the mirror lens and follows a third path back again to the first reflex mirror, is again reflected by the first reflex mirror and follows a fourth path across the second path to the second reflex mirror, is reflected by the second reflex mirror along a final path crossing said first path wherein the final path passes through the optical opening for exposure of the photosensitive material, thereby forming on the surface of the photosensitive material a four-fold reverse image of the desired size corresponding to the original to be copied.

2. The apparatus of claim 1, wherein means are provided to reciprocate said transparent plate at the upper part of the apparatus; wherein said optical opening for exposure of the original is located at the top of said optical chamber and at a position facing at least a part of a path of movement of said transparent plate wherein said optical opening for exposure of the surface of the photosensitive material is located at the side part of said optical chamber and at a position facing at least a part of the circumferential surface of said photosensitive drum; wherein said first reflex mirror is located at the bottom of said optical chamber, and wherein said second reflux mirror and said mirror lens are disposed at the said portion of said optical chamber which is opposite to the portion at which said optical for exposure of the surface of the photosensitive material is disposed.

3. The apparatus of claim 1 wherein the optical distance between the original and the mirror lens is equal to the optical distance between the mirror lens and the surface of the photosensitive material.

4. The electrostatic photographic copying apparatus of claim 1, wherein said image-forming zone includes a developing device for developing the electrostatic latent image formed on the photosensitive material by using a toner powder;

said optical system includes: an optical chamber provided with an optical element for forming an image on the surface of the photosensitive material which corresponds to the original, said optical chamber forming a chamber substantially separated from said developing device to prevent the intrusion of the toner powder from the developing device.

5. The apparatus of claim 4 wherein said optical chamber is substantially optically closed by partitioning means except for the two optical openings, and wherein said optical opening for exposure of the surface of the sensitive material includes a transparent plate.

6. The apparatus of claim 5 wherein said transparent plate is connected to said partitioning wall means through a sealing member.

* * * * *

UNITED STATES PATENT OFFICE
CERTIFICATE OF CORRECTION

Patent No. 4,033,689 Dated July 5, 1977

Inventor(s) WASHIO, ET AL.

It is certified that error appears in the above-identified patent and that said Letters Patent are hereby corrected as shown below:

Claim 2, line 13, delete "reflux", insert -- reflex --.

Claim 2, line 15, after "optical", insert -- opening --.

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*